(12) United States Patent
Sasaki

(10) Patent No.: US 11,330,282 B2
(45) Date of Patent: May 10, 2022

(54) ENCODING AND DECODING WITH SIGNALING OF SAO PARAMETERS

(71) Applicant: Socionext Inc., Kanagawa (JP)

(72) Inventor: Eiichi Sasaki, Kanagawa (JP)

(73) Assignee: Socionext Inc., Kanagawa (JP)

( * ) Notice: Subject to any disclaimer, the term of this patent is extended or adjusted under 35 U.S.C. 154(b) by 1 day.

(21) Appl. No.: 16/918,246

(22) Filed: Jul. 1, 2020

(65) Prior Publication Data

US 2020/0336754 A1    Oct. 22, 2020

Related U.S. Application Data

(63) Continuation of application No. PCT/JP2018/025141, filed on Jul. 3, 2018.

(60) Provisional application No. 62/613,920, filed on Jan. 5, 2018.

(51) Int. Cl.
| | |
|---|---|
| *H04N 19/46* | (2014.01) |
| *H04N 19/119* | (2014.01) |
| *H04N 19/132* | (2014.01) |
| *H04N 19/182* | (2014.01) |
| *H04N 19/186* | (2014.01) |

(52) U.S. Cl.
CPC ........... *H04N 19/46* (2014.11); *H04N 19/119* (2014.11); *H04N 19/132* (2014.11); *H04N 19/182* (2014.11); *H04N 19/186* (2014.11)

(58) Field of Classification Search
CPC .... H04N 19/46; H04N 19/119; H04N 19/132; H04N 19/182; H04N 19/186
USPC ................................................... 375/240.02
See application file for complete search history.

(56) References Cited

U.S. PATENT DOCUMENTS

| | | |
|---|---|---|
| 2013/0114674 A1 | 5/2013 | Chong et al. |
| 2013/0208788 A1 | 8/2013 | Chen et al. |
| 2014/0140416 A1 | 5/2014 | Yamazaki et al. |
| 2014/0301480 A1 | 10/2014 | Francois et al. |
| 2014/0301489 A1 | 10/2014 | Laroche et al. |
| 2014/0369429 A1 | 12/2014 | Laroche et al. |
| 2015/0195534 A1 | 7/2015 | Park et al. |

FOREIGN PATENT DOCUMENTS

| | | |
|---|---|---|
| CN | 103248888 | 8/2013 |
| CN | 103647975 | 3/2014 |
| CN | 106817583 | 6/2017 |
| JP | 2014-533048 | 12/2014 |

(Continued)

OTHER PUBLICATIONS

J. Samuelsson et al., "Conversion and Coding Practices for HDR/WCG Y'CbCr 4:2:0 Video with PQ Transfer Characteristics (Draft 4)", JCTVC-Z1017, Geneva, CH, Jan. 12-20, 2017.

(Continued)

*Primary Examiner* — On S Mung
(74) *Attorney, Agent, or Firm* — IPUSA, PLLC

(57) ABSTRACT

An encoding method includes a counting process of dividing a gray-scale range of pixels of a coding unit block into a plurality of classes each having a predetermined number of gray-scale levels, and counting a number of pixels belonging to each of the plurality of classes, a class addition process of selecting top n classes (n: an integer greater than or equal to 1) having a largest number of counted pixels, and adding offset values to pixel values of pixels belonging to the n selected classes; and a first signaling process of signaling SAO parameters including the added offset values.

10 Claims, 22 Drawing Sheets

(56) References Cited

FOREIGN PATENT DOCUMENTS

| JP | 2017-005504 | 1/2017 |
|----|-------------|--------|
| WO | 2013/046990 | 4/2013 |
| WO | 2013/068428 | 5/2013 |

OTHER PUBLICATIONS

K. Kawamura et al., "Luma/Chroma QP Adaptation for Hybrid Log-Gamma Sequences Encoding", JVET-G0084, Torino, IT, Jul. 13-21, 2017.
C. M. Fu et al., "Sample Adaptive Offset in the HEVC Standard", IEEE Transactions on Circuits and Systems for Video Technology, vol. 22, No. 12, Dec. 2012, pp. 1755-1764.
J. Chen et al., "Algorithm Description of Joint Exploration Test Model 7 (JEM 7)", JVET-G1001-v1, Torino, IT, Jul. 13-21, 2017.
A. Segall et al., "JVET common test conditions and evaluation procedures for HDR/WCG video", JVET-G1020, Torino, IT, Jul. 13-21, 2017.
International Search Report dated Sep. 25, 2018 with respect to No. PCT/JP2018/025141.
R. Cohen et al., "Description of screen content coding technology proposal by Mitsubishi Electric Corporation", Joint Collaborative Team on Video Coding (JCT-VC) of ITU-T SG16 WP3 and ISO/IEC JTC1/SC29/WG11 17th Meeting: Valencia, ES, Mar. 27-Apr. 4, 2014, Mar. 27, 2014, JCTVC-Q0036_r2, pp. 6-8, Cited in ISR for No. PCT/JP2018/025141.
Office Action dated Aug. 24, 2021 issued with respect to the corresponding Chinese Patent Application No. 201880085180.4.
Office Action dated Mar. 1, 2022 issued with respect to the corresponding Chinese Patent Application No. 201880085180.4.

ENCODING AND DECODING WITH SIGNALING OF SAO PARAMETERS

CROSS-REFERENCE TO RELATED APPLICATIONS

This application is a continuation of International Application PCT/JP2018/025141, filed on Jul. 3, 2018 and designated the U.S., which is based on and claims priority to U.S. Provisional Patent Application No. 62/613,920, filed on Jan. 5, 2018, with the United States Patent and Trademark Office. The entire contents of these applications are incorporated herein by reference.

BACKGROUND OF THE INVENTION

1. Field of the Invention

The disclosures herein relate to a coding method, a decoding method, a coding apparatus, a decoding apparatus, an encoding program, and a decoding program.

2. Description of the Related Art

H.265/HEVC is known as an international standard for compression encoding of video data. In H.265/HEVC, Sample Adaptive Offset is utilized as a loop filter technology to reduce the degradation of image quality during compression encoding.

Sample Adaptive Offset utilized in H.265/HEVC includes Edge Offset and Band Offset, and either one of these offsets may be applied during compression encoding. Among these, the Band Offset process divides the gray-scale range into 32 bands, and selects 4 consecutive bands based on a band position selected from these bands, followed by adding (or subtracting) offset values to the pixel values of pixels belonging to each of the four bands.

Applying such a band offset allows the pixel values corresponding to particular consecutive gray-scale values to be adjusted, thereby reducing error during compression encoding and improving image quality.

The fact that the currently utilized band offset has a wide bandwidth and is directed to specific consecutive gray-scale values makes it difficult to perform fine adjustment of pixel values, which gives rise to a problem in that there is a limit to the improvement of image quality.

Since the values at and around the median of gray-scale values in color difference are colorless, the presence of distortion is likely to cause degradation in subjective image quality, for example. However, the currently utilized band offset provides only a wide bandwidth, and cannot add (or subtract) offset values to proper targets when four consecutive bands other than the median value are selected as targets. In consideration of this, the next generation video codec (i.e., the next generation codec after H.265/HEVC), which is currently under consideration, is required to provide improvement in image quality regarding band offset.

The band offset also signals SAO parameters inclusive of both a determined band position and offset values corresponding to four respective bands selected for each block for transmission to the decoder. There is thus a problem that a large number of bits are transmitted to the decoder as SAO parameters. In consideration of this, the next generation video codec currently under consideration is required to reduce the number of bits in SAO parameters.

According to one aspect, the objective is to improve image quality and reduce the number of bits in SAO parameters.

Patent Document

[Patent Document 1] National Publication of International Patent Application No. 2014-534762

SUMMARY OF THE INVENTION

An encoding method includes a counting process of dividing a gray-scale range of pixels of a coding unit block into a plurality of classes each having a predetermined number of gray-scale levels, and counting a number of pixels belonging to each of the plurality of classes, a class addition process of selecting top n classes (n: an integer greater than or equal to 1) having a largest number of counted pixels, and adding offset values to pixel values of pixels belonging to the n selected classes; and a first signaling process of signaling SAO parameters including the added offset values.

According to at least one embodiment, image quality is improved, and the number of bits in SAO parameters are reduced

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments will be described with reference to the accompanying drawings. In the present specification and drawings, components having substantially the same functional configurations are referred to by the same numerals, and a duplicate description thereof will be omitted.

First Embodiment

<1. Examples of Encoder and Decoder Application>

Figure 1:
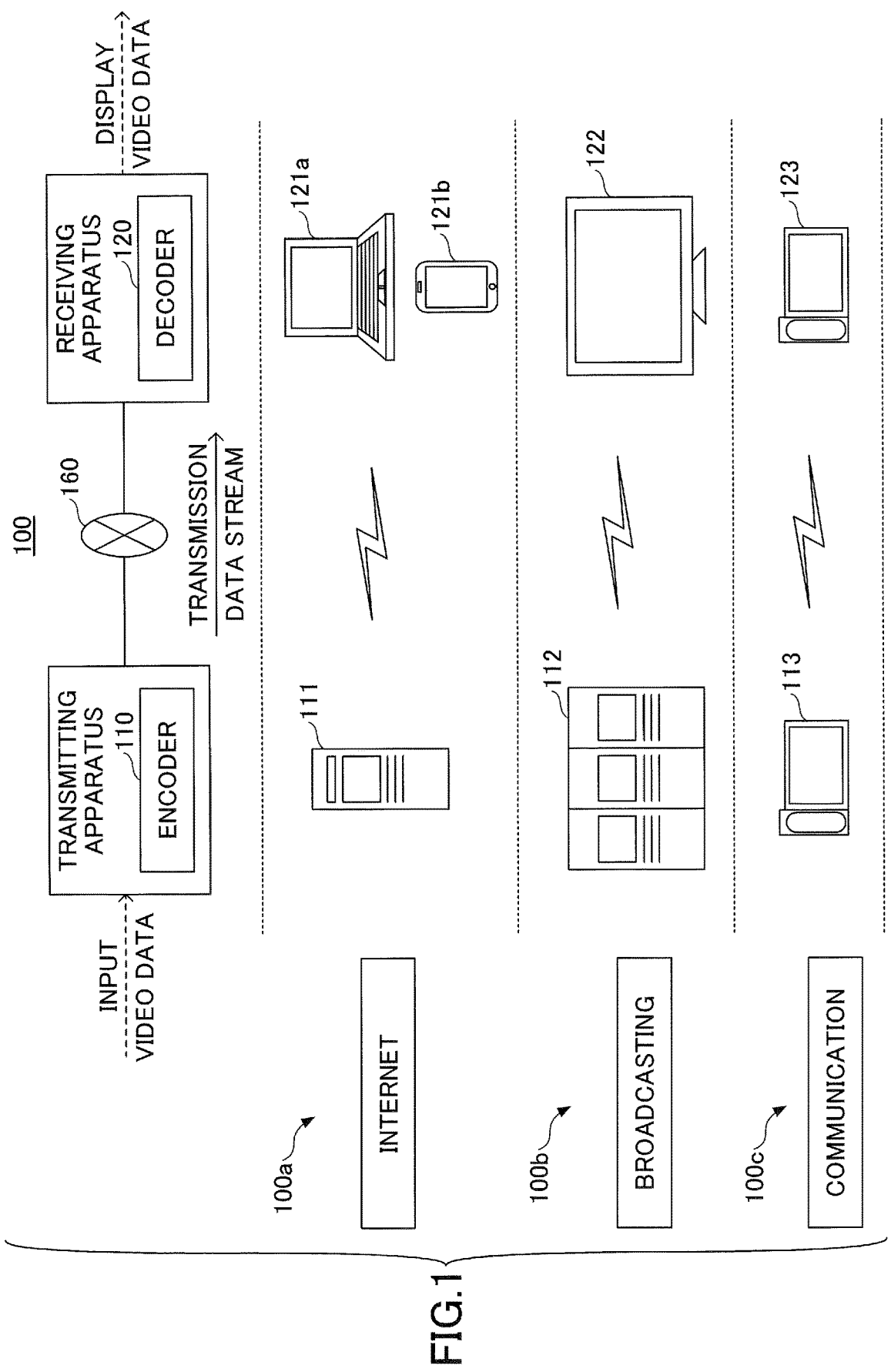
FIG. 1 is a drawing illustrating an example of application of an encoder and a decoder.

First, an example of application of an encoder (encoding apparatus) and a decoder (decoding apparatus) will be described. FIG. 1 is a drawing illustrating an example of application of an encoder and a decoder.

As illustrated in FIG. 1, an encoder 110 and a decoder 120 may be provided in a transmitting apparatus and in a receiving apparatus, respectively, and are connected via a network 160 to form an image processing system 100 to which the encoder 110 and the decoder 120 are applied.

In the image processing system 100, the encoder 110 provided in the transmitting apparatus generates a data stream (coding sequence) by encoding input video data. The transmitting apparatus transmits the generated data stream to the receiving apparatus via the network 160.

The receiving apparatus receives the data stream. The decoder 120 provided in the receiving apparatus decodes the data stream to generate and display video data.

Configuring such an image processing system 100 allows transmission load to be reduced when transmitting video data. Because of this reason, the image processing system 100 may be applied to various fields such as the Internet field, the broadcasting field, the telecommunication field, and the like.

An application example 100a illustrates an example in which the image processing system 100 is applied to the Internet field. In the case of the application example 100a, a data stream transmitted from a server apparatus 111, which is an example of the transmitting apparatus 110, is received and displayed by a personal computer 121a, a smart terminal 121b, or the like, which is an example of the receiving apparatus 120. With this configuration, the user of the personal computer 121a or the smart terminal 121b can view the video data stored in the server apparatus 111 via the Internet.

An application example 100b illustrates an example in which the image processing system 100 is applied to the broadcasting field. In the case of the application example 100b, a data stream transmitted from a broadcasting transmitter 112, which is an example of the transmitting apparatus 110 is received and displayed by a television set 122, which is an example of the receiving apparatus 120. With this configuration, the user of the television set 122 can view broadcast content transmitted by the broadcasting transmitter 112.

An application example 100c illustrates an example in which the image processing system 100 is applied to the telecommunication field. In the case of the application example 100c, a data stream transmitted from a videophone 113, which is an example of the transmitting apparatus 110, is received and displayed by a videophone 123, which is an example of the receiving apparatus 120. With this configuration, the user of the videophone 123 can talk while viewing the face of the other party.

Figure 2:
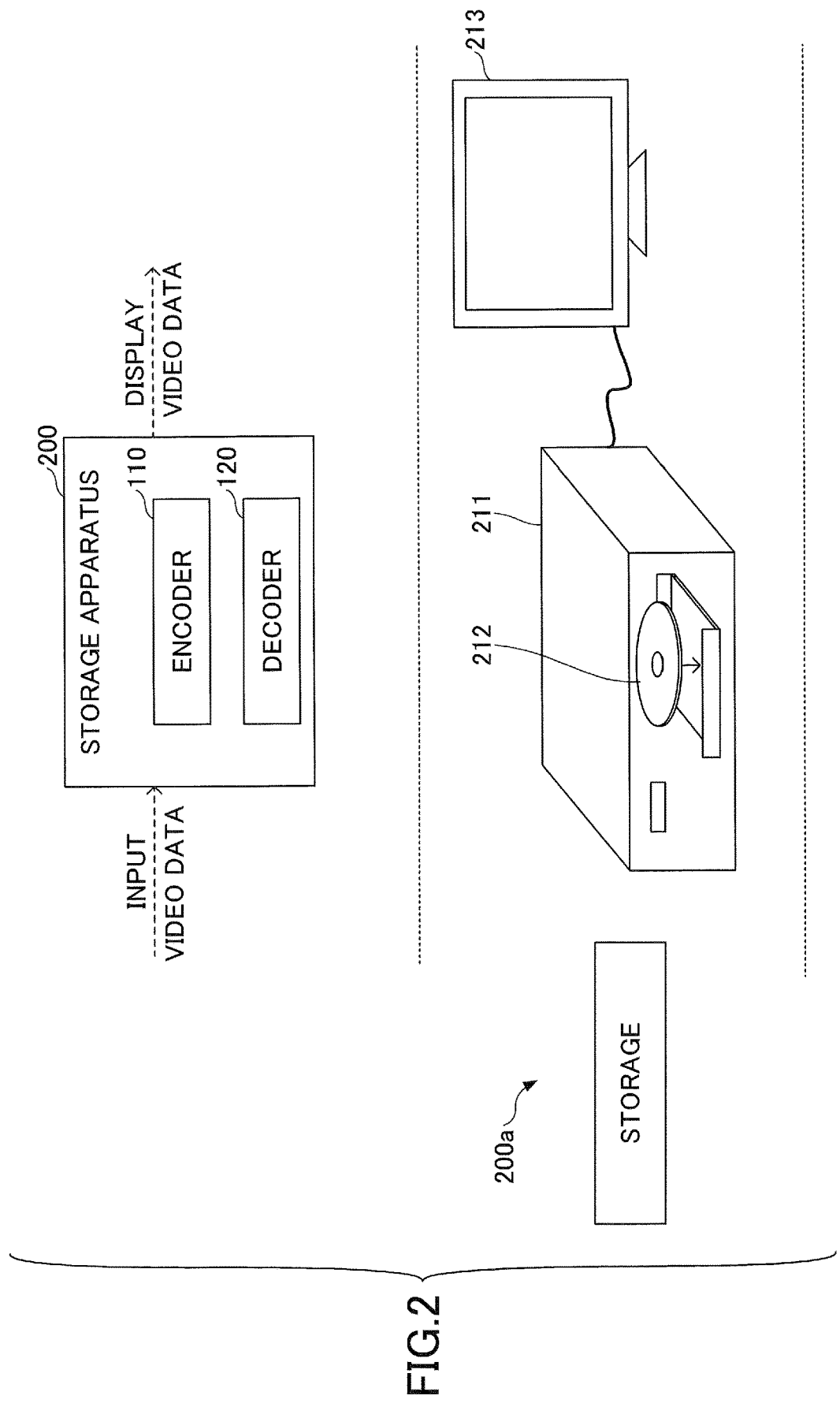
FIG. 2 is a drawing illustrating another example of application of the encoder and the decoder.

FIG. 2 illustrates another example of application of the encoder and the decoder. As illustrated in FIG. 2, the encoder 110 and the decoder 120 may be configured as an integral unit to provide a storage apparatus 200 to which the encoder 110 and the decoder 120 are applied.

The encoder 110 of the storage apparatus 200 encodes input video data to store the generated data stream in a recording medium. The decoder 120 of the storage apparatus 200 decodes the data stream stored in the recording medium to generate and display the video data.

Configuring such a storage apparatus 200 enables the reduction of capacity needed to store video data, and may thus be applicable to the storage field. The application example 200a illustrates an example in which the storage apparatus 200 is applied to the storage field. In the case of the application example 200a, a video recorder 211, which is an example of the storage apparatus 200, stores a data stream, generated by the embedded encoder 110 encoding video data, in a recording medium 212. The video recorder 211 displays video data, generated by the embedded decoder 120 decoding a data stream retrieved from the recording medium 212, on a monitor 213. With this configuration, the user of the video recorder 211 can store acquired video data in an efficient manner.

<2. Hardware Configuration of Encoder and Decoder>

Next, the hardware configuration of the encoder and the decoder will be described. It may be noted that the encoder 110 and the decoder 120 have the same or similar hardware configuration, and the hardware configuration of the encoder 110 will be described in the following.

Figure 3:
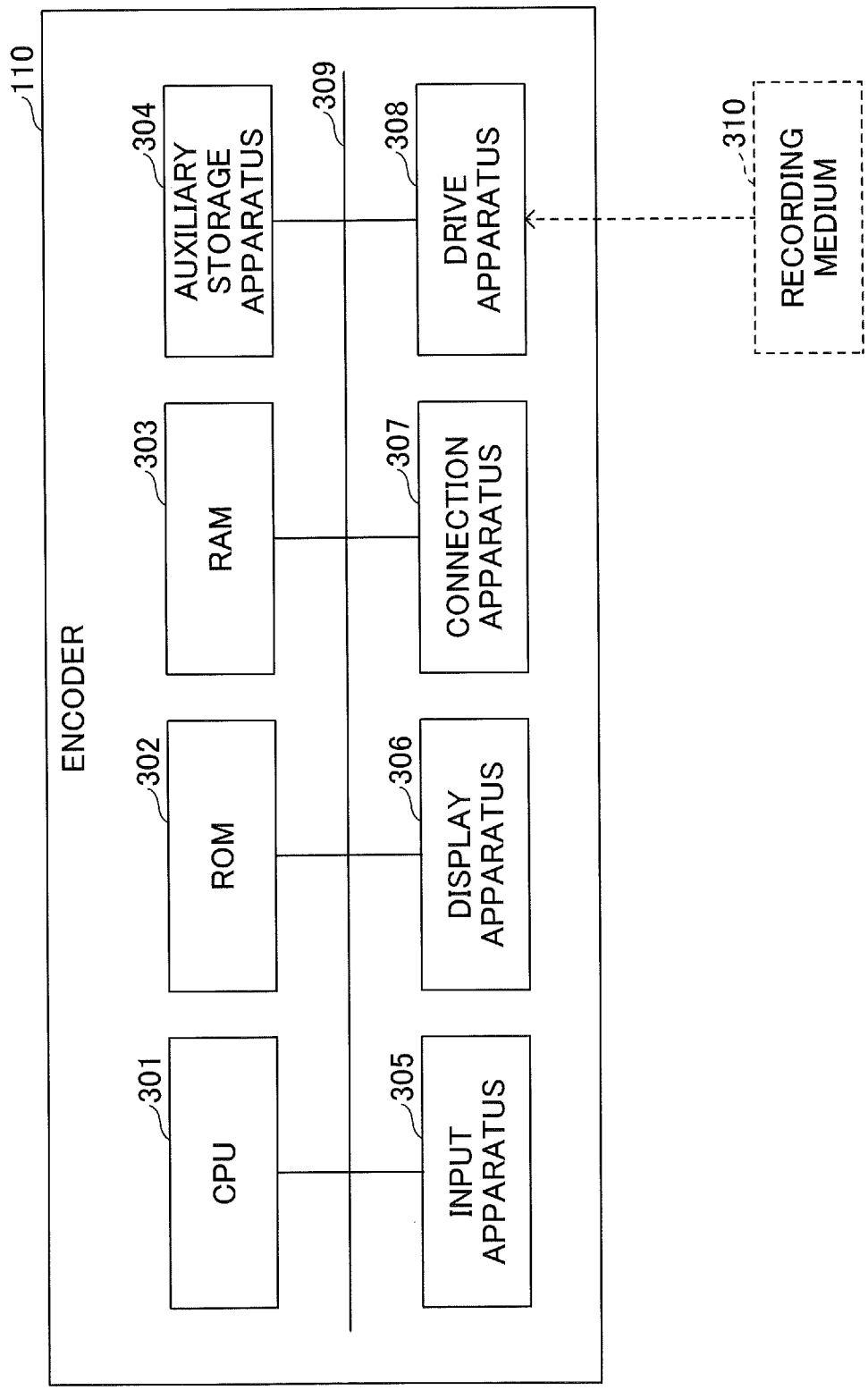
FIG. 3 is a drawing illustrating an example of the hardware configuration of the encoder.

FIG. 3 is a drawing illustrating an example of the hardware configuration of the encoder. As illustrated in FIG. 3, the encoder 110 includes a CPU (central processing unit) 301, a ROM (read only memory) 302, and a RAM (random access memory) 303. The CPU 301, the ROM 302, and the RAM 303 constitute a computer. The encoder 110 also includes an auxiliary storage apparatus 304, an input apparatus 305, a display apparatus 306, a connection apparatus 307, and a drive apparatus 308. The hardware units of the encoder 110 are interconnected to each other via a bus 309.

The CPU 301 executes various programs installed in the auxiliary storage apparatus 304 (e.g., an encoding program (or a decoding program in the case of the decoder 120) or the like).

The ROM 302 is a nonvolatile memory. The ROM 302 functions as a main storage apparatus for storing various programs, data, and the like necessary for the CPU 301 to execute various programs installed in the auxiliary storage apparatus 304. Specifically, the ROM 302 stores a boot program such as BIOS (basic input/output system) and EFI (extensible firmware interface).

The RAM 303 is a volatile memory such as a DRAM (dynamic random access memory) or an SRAM (static random access memory). The RAM 303 functions as a main storage apparatus that provides a work area prepared for the CPU 301 to execute various programs installed in the auxiliary storage apparatus 304.

The auxiliary storage apparatus 304 is an auxiliary storage device that stores various installed programs and information used in executing the various programs.

The input apparatus 305 is an input device used to provide various instructions to the encoder 110.

The display apparatus 306 is a display device that displays the internal information of the encoder 110. The connection apparatus 307 is a communication device through which the encoder 110 receives video data from an external source, and through which the encoder 110 connects with the decoder 120 to perform communication.

The drive apparatus 308 is a device in which a computer-readable recording medium 310 is set. The recording medium 310 herein includes a medium for optically, electrically, or magnetically recording information, such as a CD-ROM, a flexible disk, a magneto-optical disk, or the like. The recording medium 310 may also include a semiconductor memory or the like for electrically recording information, such as a ROM, a flash memory, or the like.

The various programs installed in the auxiliary storage apparatus 304 may be installed by setting a distributed recording medium 310 in the drive apparatus 308, which retrieves the various programs recorded in the recording medium 310. Alternatively, the various programs installed in the auxiliary storage apparatus 304 may be installed by downloading them from a network 160 via the connection apparatus 307.

The hardware configuration illustrated in FIG. 3 is merely an example, and it is obvious that some of the hardware units illustrated in FIG. 3 may be removed, or replaced with other hardware units depending on the application.

<3. Functional Configuration of Encoder>

Figure 4:
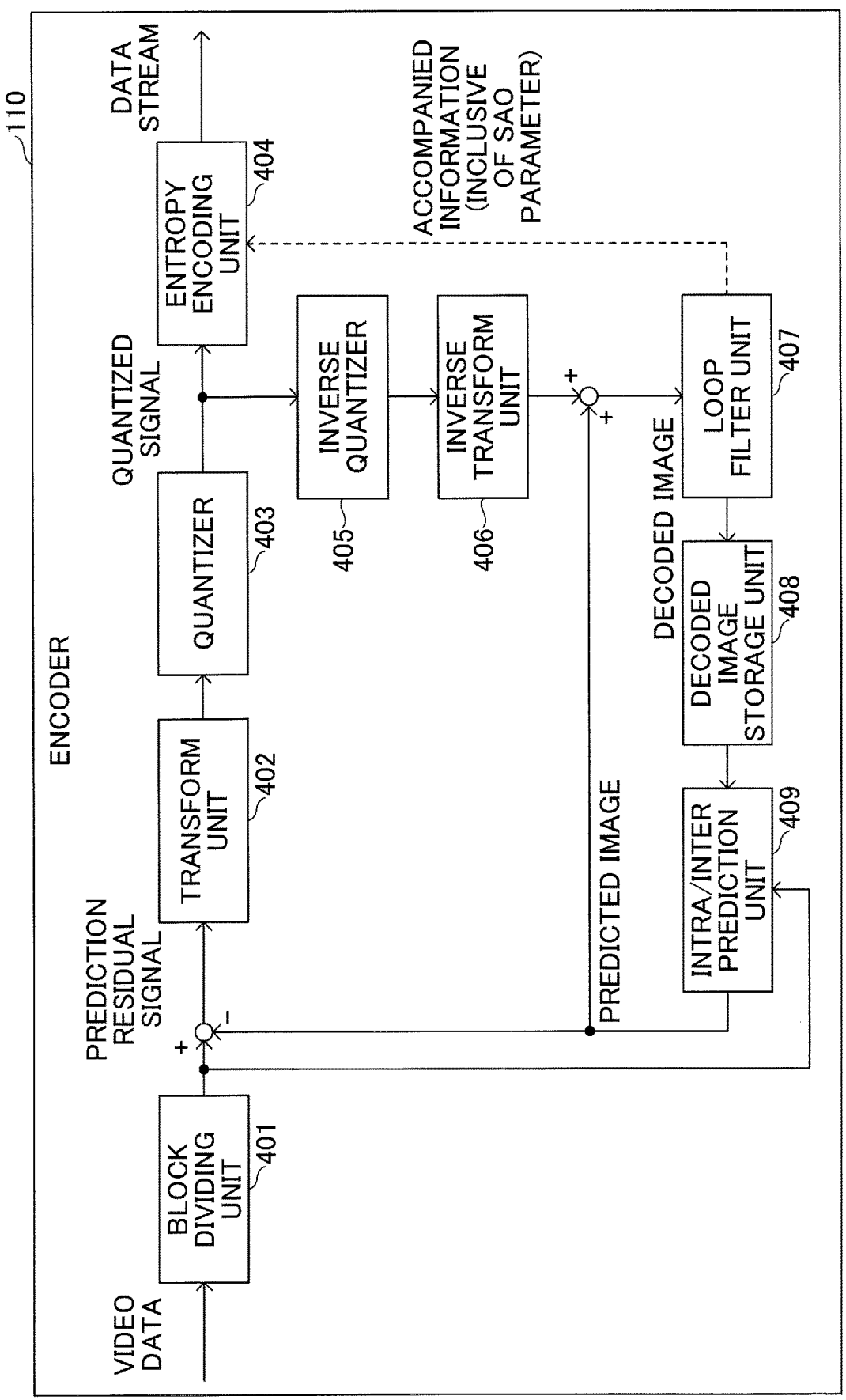
FIG. 4 is a drawing illustrating an example of the functional configuration of the encoder.

In the following, the functional configuration of the encoder 110 realized by executing an encoding program will be described. FIG. 4 is a drawing illustrating an example of the functional configuration of an encoder. As illustrated in FIG. 4, the encoder 110 includes a block dividing unit 401, a transform unit 402, a quantizer 403, and an entropy encoding unit 404. The encoder 110 further includes an inverse quantizer 405, an inverse transform unit 406, a loop filter unit 407, a decoded image storage unit 408, and an intra/inter prediction unit 409.

The block dividing unit 401 divides each picture (i.e., input picture) included in input video data into fixed-size blocks provided in a stream. The block dividing unit 401 further recursively divides each of the fixed-size blocks into coding unit blocks.

It may be noted that the block dividing unit of H.265/HEVC divides an input picture into a stream of fixed-size blocks, each of which is a CTU (coding tree unit). The block dividing unit of H.265/HEVC further divides each CTU block into coding unit blocks, each of which is CU (coding unit). Moreover, the block dividing unit of H.265/HEVC divides each CU block into prediction unit (PU) and transform unit (TU) blocks.

In the next generation codec after H.265/HEVC, however, PU and TU may not be used, and CU may only be used as partition blocks. In consideration of this, the present embodiment will be described such that the block dividing unit 401 divides a CTU block into CU blocks only. According to the discussions regarding the next generation codec after H.265/HEVC, further, the CTU block size is 128 pixels×128 pixels at the maximum. The description in the following will thus be given based on a CTU block size of 128 pixels×128 pixels.

Each input picture divided into CU blocks by the block dividing unit 401 is reported to the intra/inter prediction unit 409, and, also, is used in the calculation of prediction residual signals.

The transform unit 402 performs orthogonal transformation with respect to the prediction residual signal calculated based on the difference between the input image of each CU block in the input picture and the predicted image of a corresponding CU block.

The quantizer 403 quantizes the prediction residual signal on which the orthogonal transformation has been performed to generate a quantized signal for outputting to the entropy encoding unit 404 and to the inverse quantizer 405.

The entropy encoding unit 404 performs entropy encoding on the quantized signal to generate and output a data stream.

The inverse quantizer 405 performs inverse quantization on the quantized signal for provision to the inverse transform unit 406. The inverse transform unit 406 performs inverse orthogonal transformation on the inversely quantized version of the quantized signal. The signal produced by the inverse transform unit 406 is added to a predicted image generated by the intra/inter prediction unit 409, for example, thereby generating a decoded image for provision to the loop filter unit 407.

The loop filter unit 407 performs filtering to reduce encoding noise in the decoded image input thereto. The loop filter unit 407 further includes:
 a deblocking filter unit; and
 a Sample Adaptive Offset process unit,
which will be described later in detail. Parameters used by these units of the loop filter unit 407 for performing processes (e.g., Sample Adaptive Offset parameters (SAO parameters) or the like used when the Sample Adaptive Offset process unit performs a Sample Adaptive Offset process) are signaled. The parameters (inclusive of the SAO parameters) signaled by the loop filter unit 407 are incorporated into the data stream by the entropy encoding unit 404 as accompanied information.

The decoded image storage unit 408 stores the decoded image filtered by the loop filter unit 407 on a picture-specific basis.

The intra/inter prediction unit 409 uses the decoded image of each CU block in a picture undergoing decoding to perform an intra prediction (in-picture prediction) that generates a predicted image of a CU block being processed. The intra/inter prediction unit 409 further performs inter-picture motion compensation by using the decoded image of each CU block in one or more reference pictures, thereby performing inter prediction for motion compensation (i.e., inter-picture prediction) that generates a predicted image of a CU block being processed.

Moreover, the intra/inter prediction unit 409 outputs either an intra prediction image which is a predicted image of each CU block generated by the intra prediction or an inter prediction image which is a predicted image of each CU block generated by the inter prediction for motion compensation.

The predicted image of each CU block output from the intra/inter prediction unit 409 is used to calculate a residual for the input image of each CU block in the input picture. The calculated prediction residual signal is supplied to the transform unit 402. The predicted image output from the intra/inter prediction unit 409 is added to the signal produced by the inverse transform unit 406 for provision as a decoded image to the loop filter unit 407.

<4. Loop Filter Unit>

In the following, the details of the loop filter unit 407 of the encoder 110 will be described. Before describing the details of the loop filter unit 407 of the encoder 110, however, a loop filter unit of a general encoder (in H.265/HEVC) will be described in detail in order to provide a reference for comparison. In the following, the descriptions in "4.1" to "4.4" will be regarding the details of a loop filter unit of a general encoder. Thereafter, the descriptions in "4.5" to "4.8" will provide the details of the loop filter unit 407 of the encoder 110 according to the first embodiment.

<4.1 Functional Configuration of Loop Filter Unit of General Encoder>

Figure 5:
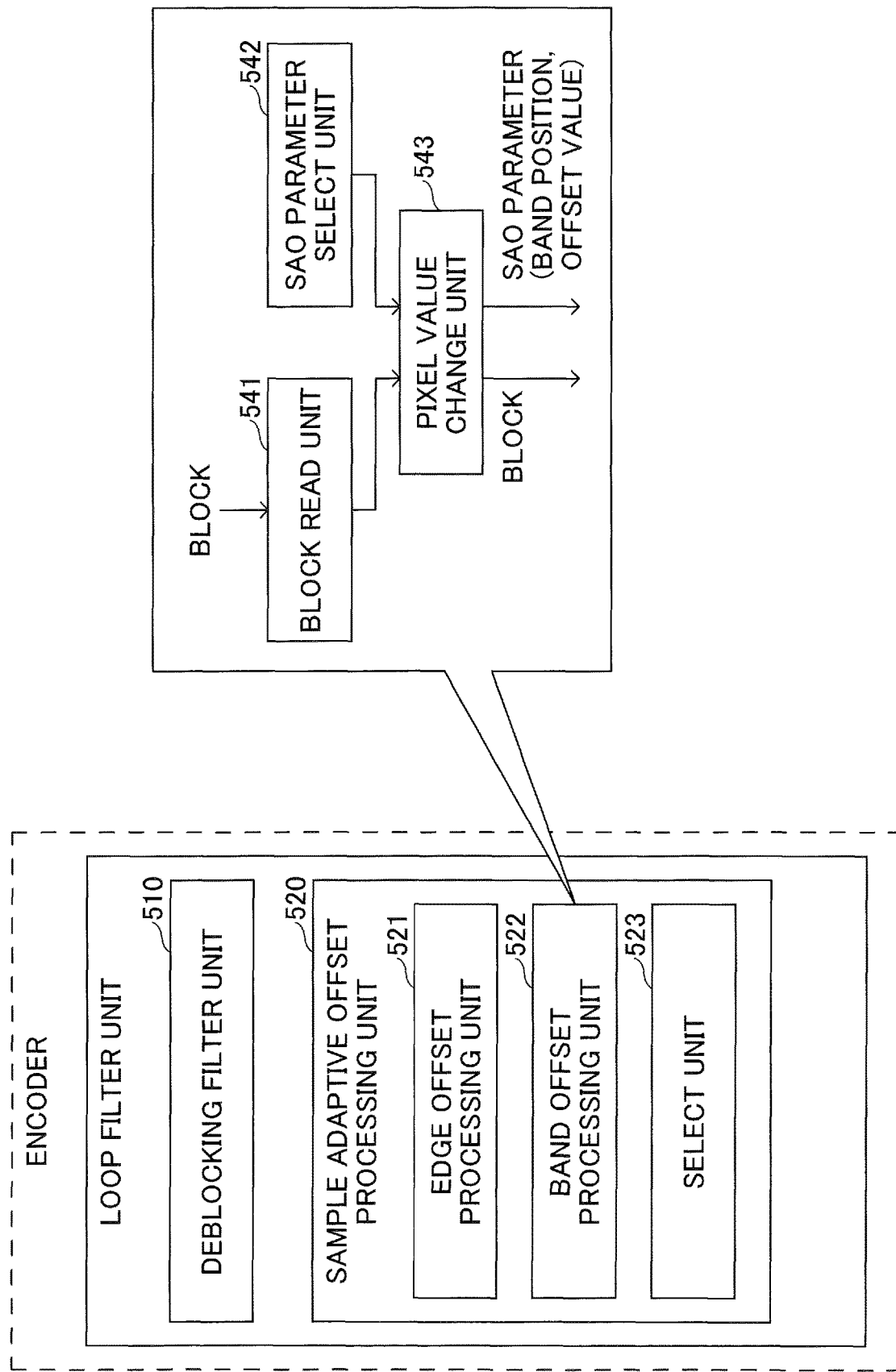
FIG. 5 is a drawing illustrating an example of the functional configuration of a loop filter unit of a general encoder.

FIG. 5 is a drawing illustrating an example of the functional configuration of a loop filter unit of a general encoder. As illustrated in FIG. 5, the loop filter unit includes a deblocking filter unit 510 and a sample adaptive offset processing unit 520.

The deblocking filter unit 510 performs filtering on the decoded image of a block being processed to reduce distortion generated at the block boundaries when the input image of each CU block in an input picture is encoded. The sample adaptive offset processing unit 520 classifies, on a pixel-specific basis, the decoded image of a block being processed that has been filtered by the deblocking filter unit 510, and adds an offset value responsive to the classification to each pixel.

It may be noted that the sample adaptive offset processing unit 520 includes an edge offset processing unit 521, a band offset processing unit 522, and a select unit 523.

The edge offset processing unit 521 classifies an edge state based on the relationship between the sizes of pixel values of three consecutive pixels aligned in the direction specified as an edge offset class. The edge offset processing unit 521 further adds an offset value responsive to the classification of an edge state to a pixel value of the decoded image of a block being processed. The edge offset processing unit 521 sends the select unit 523 the block being processed in which the offset value has been added to the pixel value.

The edge offset processing unit 521 executes these processes (i.e., edge offset processing) for each SAO parameter while successively selecting a SAO parameter for the edge offset processing.

The band offset processing unit 522 divides the gray-scale range of possible pixel values for the decoded image of a block being processed into 32 bands, and selects 4 consecutive bands based on a band position selected from these 32 bands. The band offset processing unit 522 adds (or subtracts) an offset value to the pixel value of a pixel belonging to any of the 4 bands.

Specifically, as illustrated on the right-hand side of FIG. 5, the band offset processing unit 522 includes a block read unit 541, an SAO parameter select unit 542, and a pixel value change unit 543. The block read unit 541 reads the decoded image of a block being processed among the decoded images of blocks acquired by the sample adaptive offset processing unit 520 for provision to the pixel value change unit 543. The SAO parameter select unit 542 divides the gray-scale range of possible pixel values for the decoded image of a block being processed into 32 bands, and select SAO parameters (band positions and offset values) relevant to the band offset processing for outputting to the pixel value change unit 543.

The pixel value change unit 543 adds an offset value to the pixel value of a pixel belonging to any of the 4 consecutive bands based on the band position wherein the noted pixel value is among the pixel values of the color components (i.e., the brightness signal (Y) and the color difference signals (Cb and Cr)) of the decoded image of a block being processed. The pixel value change unit 543 sends the select unit 523 the decoded image of a block being processed in which offset values are added, together with the SAO parameters (band positions and offset values) relating to band offset processing.

The band offset processing unit 522 executes these processes (i.e., band offset processing) for each SAO parameter while successively selecting an SAO parameter (a band position and an offset value) relating to the band offset processing.

The select unit 523 receives the result of each processing performed by the edge offset processing unit 521 and the result of each processing performed by the band offset processing unit 522 for the decoded image of a block being processed, and calculates the rate-distortion (RD) cost. The select unit 523 identifies the processing result having the lowest calculated RD cost, followed by signaling the SAO parameters used in the calculation of the identified processing result.

<4.2 Flow of Sample Adaptive Offset Processing by Sample Adaptive Offset Processing Unit of General Encoder>

Figure 6:
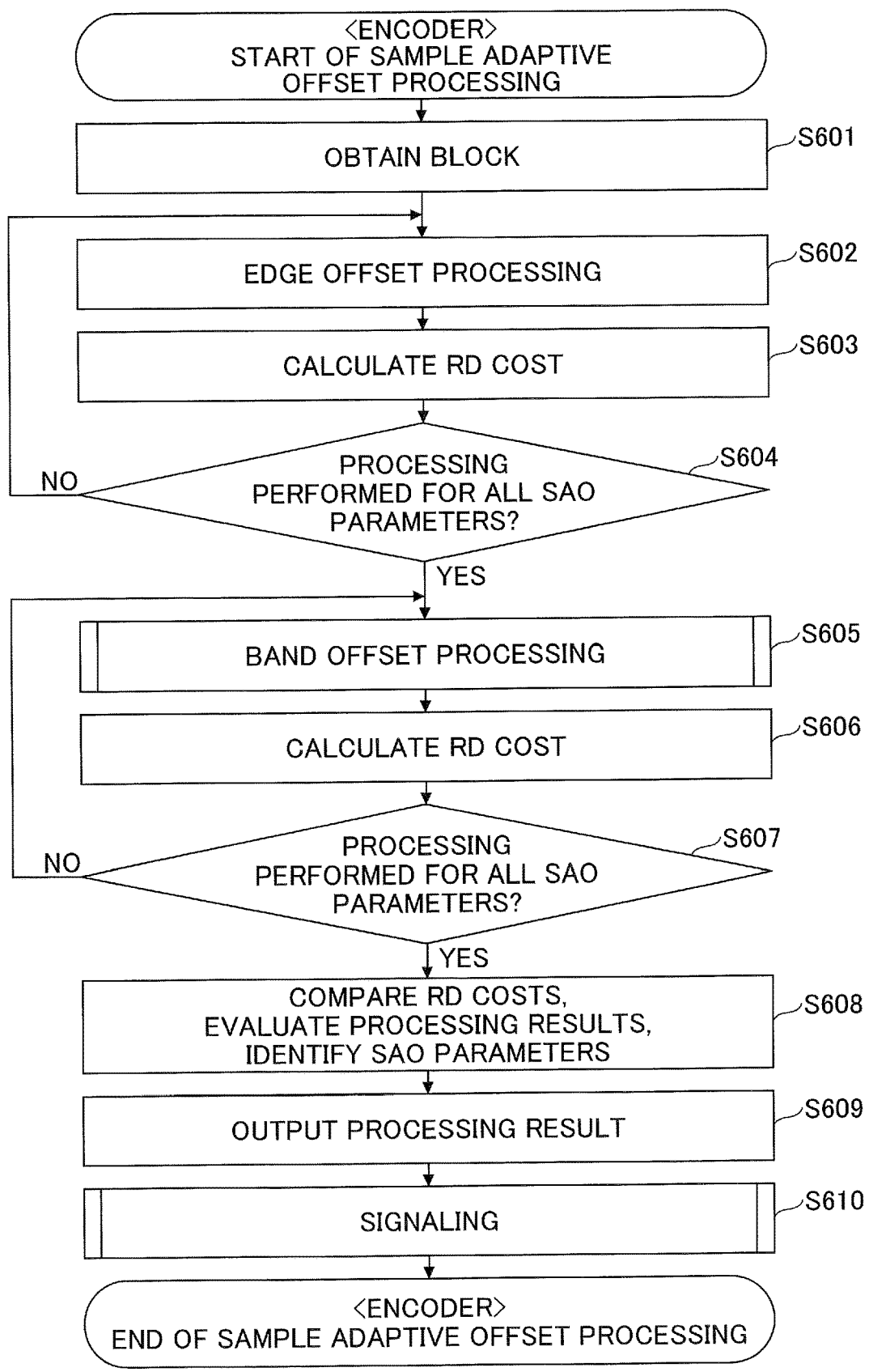
FIG. 6 is a flowchart illustrating the flow of sample adaptive offset processing performed by a general encoder.

In the following, the flow of sample adaptive offset processing by the sample adaptive offset processing unit 520 of a general encoder will be described. FIG. 6 is a flowchart illustrating the flow of sample adaptive offset processing performed by a general encoder.

Upon the completion of deblocking filtering of a block being processed by the deblocking filter unit 510, the sample adaptive offset processing unit 520 starts the sample adaptive offset processing illustrated in FIG. 6. It may be noted that, for the sake of convenience of explanation, the processing for one block being processed will be described.

In step S601, the sample adaptive offset processing unit 520 receives a block to be processed.

In step S602, the edge offset processing unit 521 reads out the received block being processed, and performs edge offset processing using predetermined SAO parameters relating to the edge offset processing.

In step S603, the select unit 523 calculates RD cost for the result of edge offset processing performed in step S602.

In step S604, the edge offset processing unit 521 checks whether the edge offset processing for a block being processed has been performed for the whole predetermined range of SAO parameters (i.e., SAO parameters relating to the edge offset processing).

Upon determining in step S604 that there is an SAO parameter not used in the execution of edge offset processing (i.e., in the case of "No" in step S604), the procedure returns to step S602.

Upon determining in step S604 that the edge offset processing has been performed for the whole predetermined range of SAO parameters, the procedure proceeds to step S605.

In step S605, the band offset processing unit 522 reads out the block being processed, and performs band offset processing (the details of which will be described later) using predetermined SAO parameters relating to the band offset processing.

In step S606, the select unit 523 calculates RD cost for the result of band offset processing performed in step S605.

In step S607, the band offset processing unit 522 checks whether the band offset processing for a block being processed has been performed for the whole predetermined range of SAO parameters (i.e., SAO parameters relating to the band offset processing).

Upon determining in step S607 that there is an SAO parameter not used in the execution of band offset processing (in the case of "No" in step S607), the procedure returns to step S605.

Upon determining in step S607 that the band offset processing has been performed for the whole predetermined range of SAO parameters, the procedure proceeds to step S608.

In step S608, the select unit 523 compares the RD costs with respect to the result of each processing performed by the edge offset processing unit 521 and the result of each processing performed by the band offset processing unit 522, and selects the processing result having the lowest RD cost. The select unit 523 identifies the SAO parameters used for calculating the selected process result.

In step S609, the select unit 523 outputs the selected processing result as the processing result of sample adaptive offset processing.

In step S610, the select unit 523 performs a signaling process (the details of which will be described later) with respect to the identified SAO parameters.

<4.3 Details of Band Offset Processing (step S605) by General Encoder>

In the following, the details of band offset processing (step S605) performed by a general encoder will be described.

(1) What is Performed in Band Offset Processing

Figure 7:
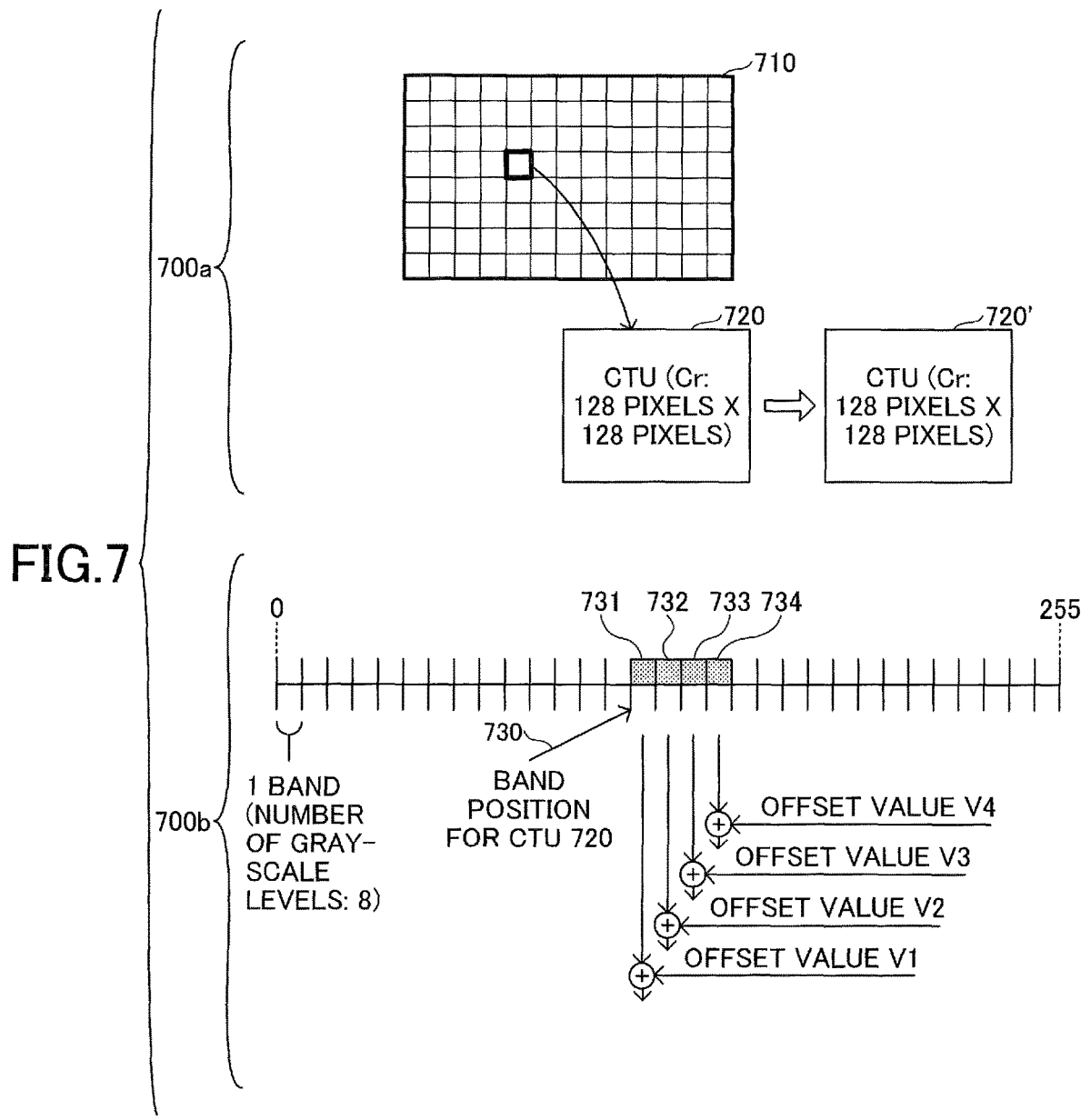
FIG. 7 is a drawing a drawing illustrating what is performed in band offset processing by a general encoder.

First, what is performed in band offset processing (step S605) will be described. FIG. 7 is a drawing illustrating what is performed in band offset processing by a general encoder. In the figure, a block being processed is illustrated in 700a of FIG. 7. As illustrated in 700a of FIG. 7, band offset processing in the case of a general encoder is performed with respect to a CTU block in a picture 710 subject to decoding. The example illustrated in 700a of FIG. 7 illustrates that band offset processing is performed with respect to a CTU block 720 of 128 pixels×128 pixels to generate a CTU block 720' as a processing result.

In 700b of FIG. 7, a specific example of band offset processing is illustrated. In the following, the band offset processing for a color difference signal (Cr), among the color components (i.e., brightness signal (Y) and color difference signals (Cb and Cr)) of the picture 710 being decoded, will be described.

As illustrated in 700b of FIG. 7, the possible pixel values of the color difference signal (Cr) in the decoded image of a block being processed may be 256 gray-scale levels in the picture 710 being decoded. In such a case, the pixel value change unit 543 divides the 256 gray-scale levels into 32 bands. This results in each band consisting of 8 gray-scale levels.

The SAO parameter select unit 542 may output a band position indicated by an arrow 730 as a band position for the decoded image of the CTU block 720. In this case, the pixel value change unit 543 identifies bands 731-734 as the 4 consecutive bands.

The pixel value change unit 543 adds an offset value V1 to the color-difference-signal-(Cr) pixel value of each pixel belonging to the band 731 among the pixels included in the decoded image of the CTU block 720. Similarly, the pixel value change unit 543 adds an offset value V2 to the color-difference-signal-(Cr) pixel value of each pixel belonging to the band 732 among the pixels included in the decoded image of the CTU block 720. Similarly, the pixel value change unit 543 adds an offset value V3 to the color-difference-signal-(Cr) pixel value of each pixel belonging to the band 733 among the pixels included in the decoded image of the CTU block 720. Similarly, the pixel value change unit 543 adds an offset value V4 to the color-difference-signal-(Cr) pixel value of each pixel belonging to the band 734 among the pixels included in the decoded image of the CTU block 720.

In this manner, the band offset processing unit 522 performs band offset processing on the decoded image of the CTU block 720 using SAO parameters (i.e., the band position indicated by the arrow 730 and the offset values V1 to V4) relating to the band offset processing. The band offset processing, unit 522 performs substantially the same band offset processing for the brightness signal (Y) and the color difference signal (Cb). Consequently, the CTU block 720' is generated as the result of band offset processing.

The offset values V1 to V4 to be added (or subtracted) for each of the 4 consecutive bands may be different from each other, or may be the same (one value).

(2) Flow of Band Offset Processing

Figure 8:
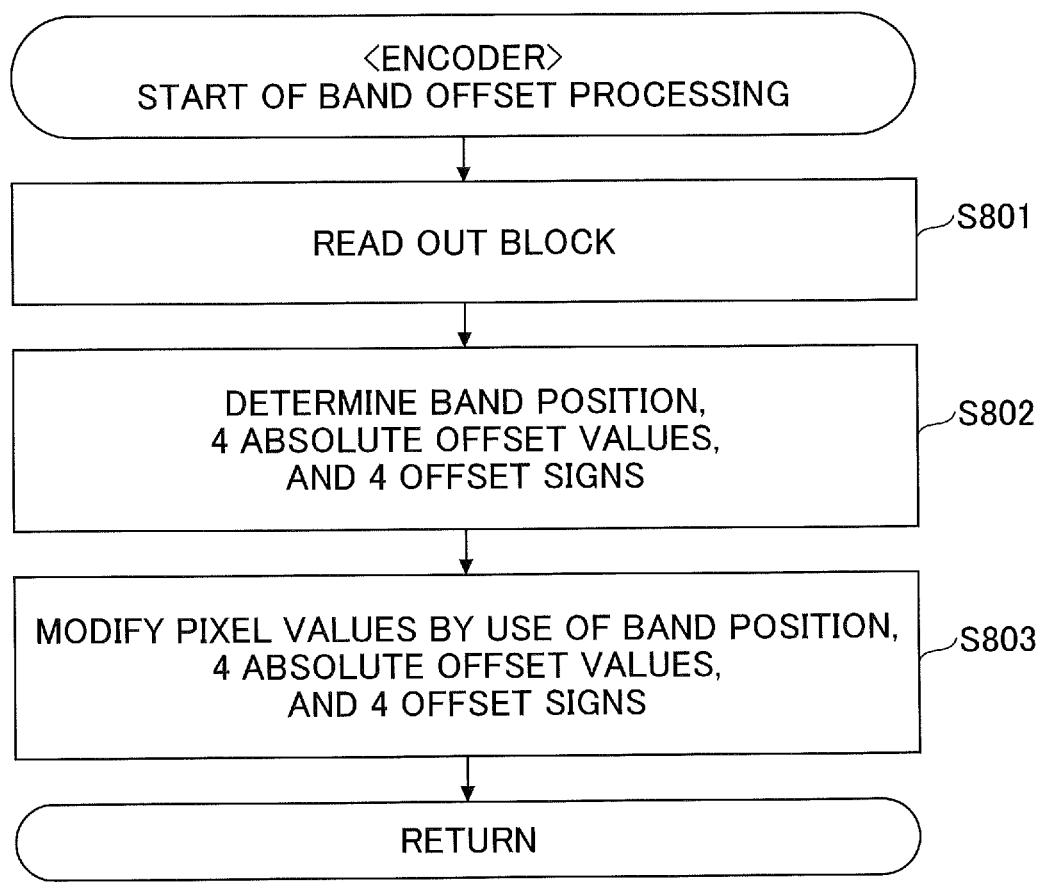
FIG. 8 is a flow chart illustrating the flow of band offset processing performed by a general encoder.
Figure 9:
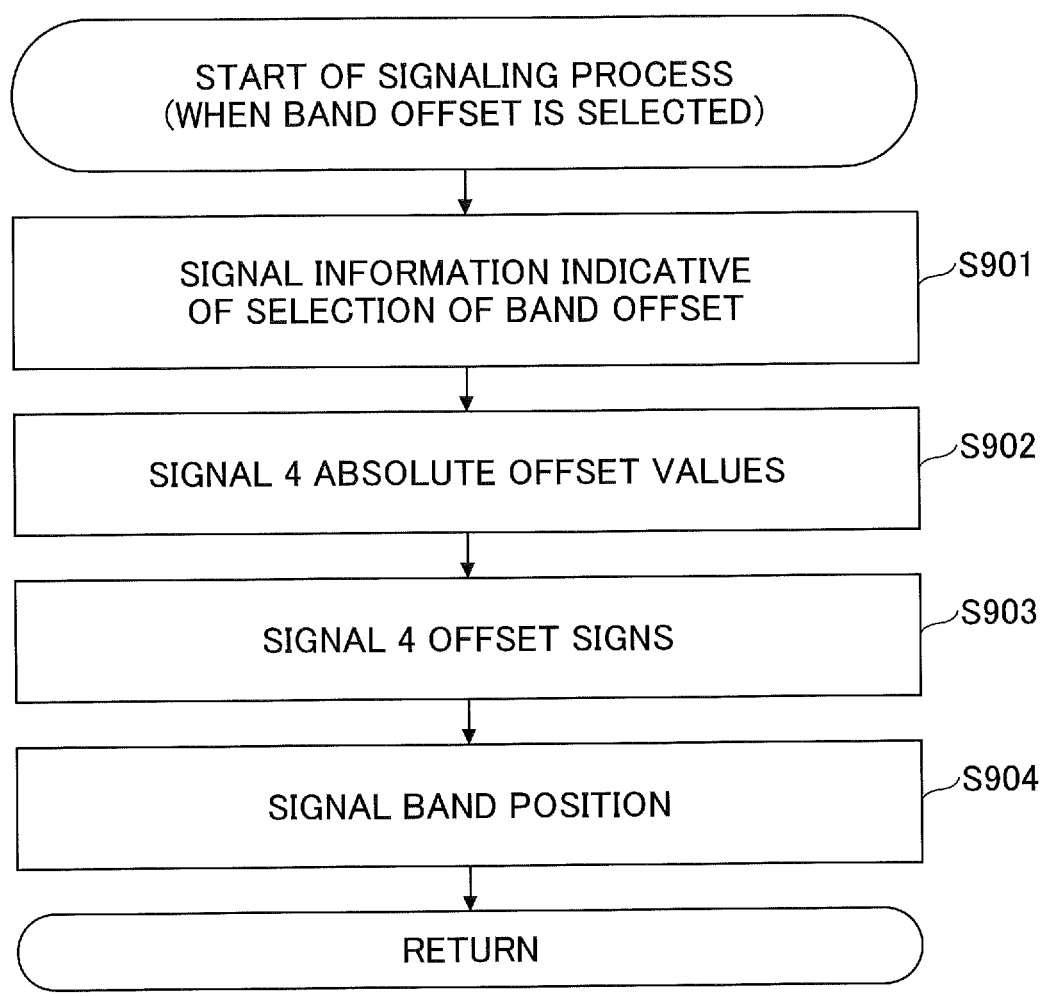
FIG. 9 is a flowchart illustrating the flow of a signaling process performed by a general encoder.

In the following, a detailed flowchart of the band offset processing (step S605) by a general encoder will be described. FIG. 8 is a flowchart illustrating the flow of band offset processing by a general encoder.

In step S801, the block read unit 541 reads out the decoded image of a block being processed among the decoded images of blocks received by the sample adaptive offset processing unit 520.

In step S802, the SAO parameter select unit 542 determines a band position as well as an absolute value of an offset and a sign of the offset as an offset value of each of the 4 consecutive bands for each color component as the SAO parameters relating to the band offset processing. The range of SAO parameters relating to the band offset processing determined by the SAO parameter select unit 542 may be preset for each color component, and the SAO parameter select unit 542 successively select SAO parameters belonging to this range. The SAO parameter select unit 542 successively outputs, to the pixel value change unit 543, the SAO parameters (i.e., the band position of each color component, the four absolute offset values, and the four offset signs) relating to the band offset processing determined for each color component.

In step S803, the pixel value change unit 543 changes pixel values in the decoded image of a block being processed for each color component using the SAO parameters (i.e., the band position of each color component, the four absolute offset values, and the four offset signs) relating to the band offset processing.

<4.4 Details of Signaling Process (step S610) by General Encoder>

In the following, a signaling process (step S610) performed by a general encoder will be described in detail. FIG.

9 is a flowchart illustrating the flow of a signaling process performed by a general encoder. The following description will be directed to a case in which the comparison of RD costs indicates that the result of band offset processing obtained by using the SAO parameters relating to the band offset processing is the processing result having the lowest RD cost.

In step S901, the select unit 523 signals information indicating that the processing result of band offset processing is selected in the sample adaptive offset processing, In step S902, the select unit 523 signals the four absolute offset values of each color component that are the SAO parameters relating to the band offset processing for which the processing result having the lowest RD cost is obtained.

In step S903, the select unit 523 signals the four offset signs of each color component that are the SAO parameters relating to the band offset processing for which the processing result having the lowest RD cost is obtained.

In step S904, the select unit 523 signals the band position of each color component that is the SAO parameter relating to the band offset processing for which the processing result having the lowest RD cost is obtained.

<4.5 Functional Configuration of Loop Filter Unit of First Embodiment Encoder>

In the following, the functional configuration of the loop filter unit 407 of the encoder 110 according to the first embodiment will be described.

Figure 10:
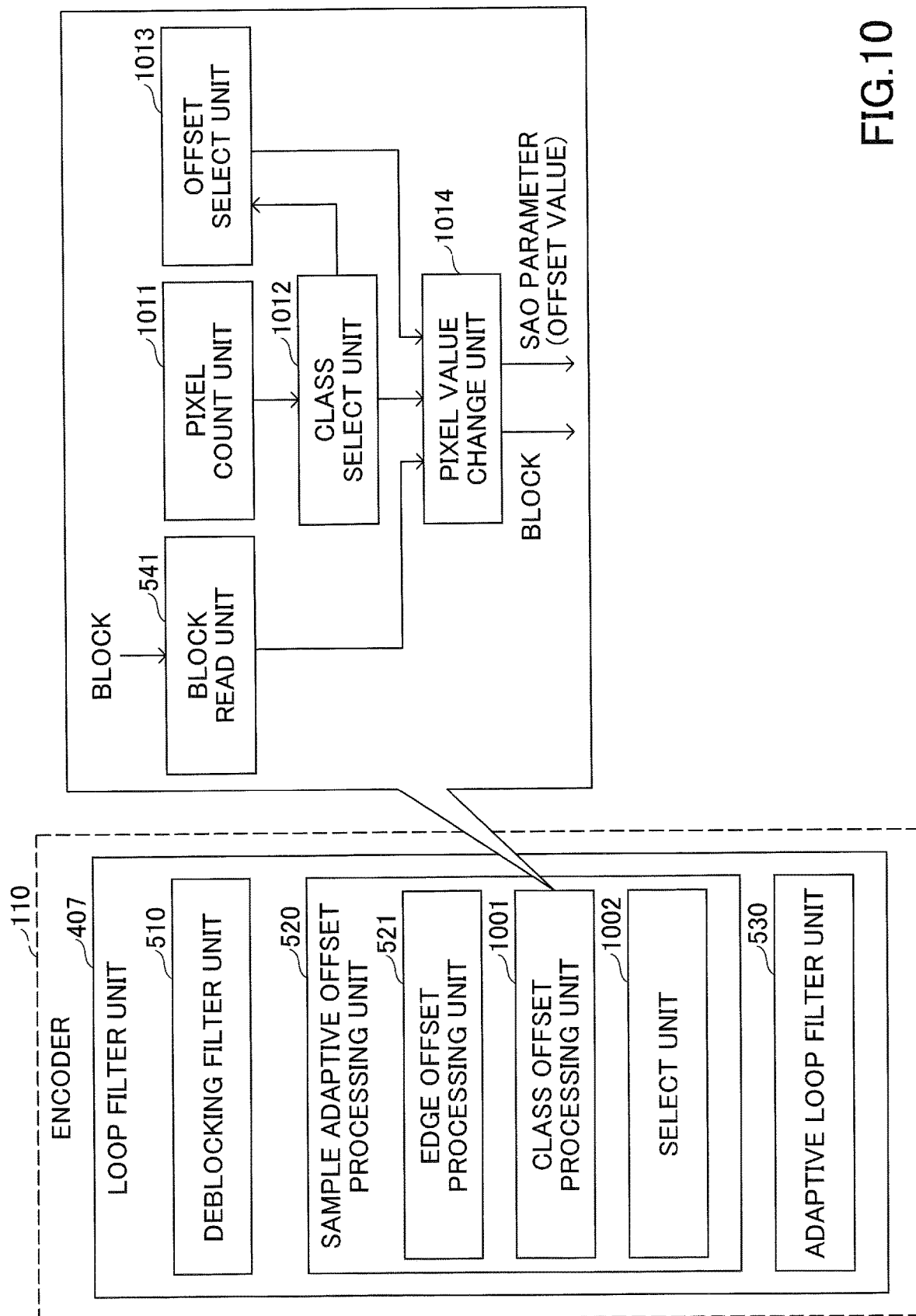
FIG. 10 is a drawing illustrating an example of the functional configuration of a loop filter unit of an encoder according to a first embodiment.

The right-hand side of FIG. 10 is a drawing illustrating an example of the functional configuration of the loop filter unit of the encoder according to the first embodiment. The same functions as those of the loop filter unit of a general encoder described with reference to FIG. 5 will be referred to by the same numerals, and the description thereof will be omitted.

The difference from FIG. 5 is that the sample adaptive offset processing unit 520 includes a class offset processing unit 1001 and that the function of a select unit 1002 is different from the function of the select unit 523. As will be described later, the class offset processing unit 1001, which may be capable of reducing color difference distortion, also serves as a CAR (chroma artifact reduction) SAO.

As illustrated in FIG. 10, the class offset processing unit 1001 includes a block read unit 541, a pixel count unit 1011, a class select unit 1012, an offset select unit 1013, and a pixel value change unit 1014.

The block read unit 541 reads out the decoded image of a block being processed among the decoded images of blocks received by the sample adaptive offset processing unit 520 for provision to the pixel value change unit 1014.

The pixel count unit 1011 is an example of a counting unit. The pixel count unit 1011 divides the gray-scale range of each color component (i.e., the brightness signal (Y) and the color difference signals (Cb and Cr)), in the decoded image of a block being processed, into a plurality of groups having a predetermined number of gray-scale levels. Such a group will hereinafter be referred to as a "class". The pixel count unit 1011 may divide the gray-scale range such that each class has the same number of gray-scale levels, or such that each class has a different number of gray-scale level.

The number of gray-scale levels of each class may be greater than or less than the number of gray-scale levels of each band that is created when the band offset processing unit 522 illustrated in FIG. 5 performs division into the 32 bands (e.g., the number of gray-scale levels of each band is 8 when the gray-scale range is 256 levels).

When the number of gray-scale levels of each class is made smaller than the number of gray-scale levels of each band (i.e., when the band width is narrowed), an offset value can be added to a specific area having small deterioration within a block being processed. In this case, the effect of improving color shift may be enhanced, compared with the band offset processing by a general encoder.

The pixel count unit 1011 classifies, for each color component, each pixel included in the decoded image of a block being processed into one of the classes based on the pixel value, followed by counting the number of pixels belonging to each class.

The class select unit 1012 selects, for each color component, the top n classes having the largest number of counted pixels (n: an integer greater than or equal to 1, such as 3) for notification to the pixel value change unit 1014.

It may be noted that the number of top n classes selected for each color component may be set to less than four (i.e., the number of bands for adding an offset value may be reduced compared with the case of a general encoder), thereby reducing the number of bits required to signal the offset values of each color component.

As an alternative example, when the color component of the decoded image of a block being processed is a color difference signal (Cb or Cr), the class select unit 1012 may select m classes (m: an integer greater than or equal to 1, such as 6) situated at and around the median value of the gray-scale range $(1<<(\text{bit depth}-1))$. The class select unit 1012 then selects from these m classes the top n classes having the largest number of counted pixels (n: an integer greater than or equal to 1, such as 3) for notification to the pixel value change unit 1014.

It may be noted that an area around the median value of the gray-scale range is colorless, so that the area around the median value is selected as a default to improve subjective image quality when there is distortion. Further, the number of selected top n classes may be set to less than 4 (i.e., the number of bands for adding an offset value may be reduced compared with the case of a general encoder), thereby reducing the number of bits required to signal the offset values of each color component.

The offset select unit 1013 receives information about the n selected classes from the class select unit 1012, and determines n offset values (i.e., n absolute offset values and n offset signs) for each color component such that the square error of pixel values at the time of decoding is minimized. The offset select unit 1013 sends the pixel value change unit 1014 the n selected offset values of each color component.

The pixel value change unit 1014 is an example of a class addition unit. The pixel value change unit 1014 adds a selected offset value for each color component to the pixel value of each pixel belonging to any of the classes selected by the class select unit 1012 among the pixels included in the decoded image of a block being processed. The pixel value change unit 1014 outputs to the select unit 1002 a decoded image of a block being processed in which the offset values have been added for each color component. The pixel value change unit 1014 further outputs to the select unit 1002 the SAO parameters inclusive of the offset values for each color component as the SAO parameters relating to the class offset processing.

The select unit 1002 is an example of a signaling unit. The select unit 1002 receives the result of each processing performed by the edge offset processing unit 521 and the result of each processing performed by the class offset processing unit 1001 for the decoded image of a block being processed, followed by calculating RD costs. The select unit 1002 identifies the processing result having the lowest calculated RD cost, and selects the identified processing result for outputting to the adaptive loop filter unit 530.

Moreover, the select unit 1002 signals the SAO parameters used in the calculation of the identified processing result.

<4.6 Details of Class Offset Processing by First Embodiment Encoder>

In the following, the details of class offset processing performed by the encoder 110 according to the first embodiment will be described.

(1) Specific Example of Class Offset Processing

A specific example of class offset processing will be described first. Similarly to the case of a description of FIG. 7, the class offset processing for a color difference signal (Cr) will be described in the following.

(1-1) Specific Example 1 of Class Offset Processing

Figure 11:
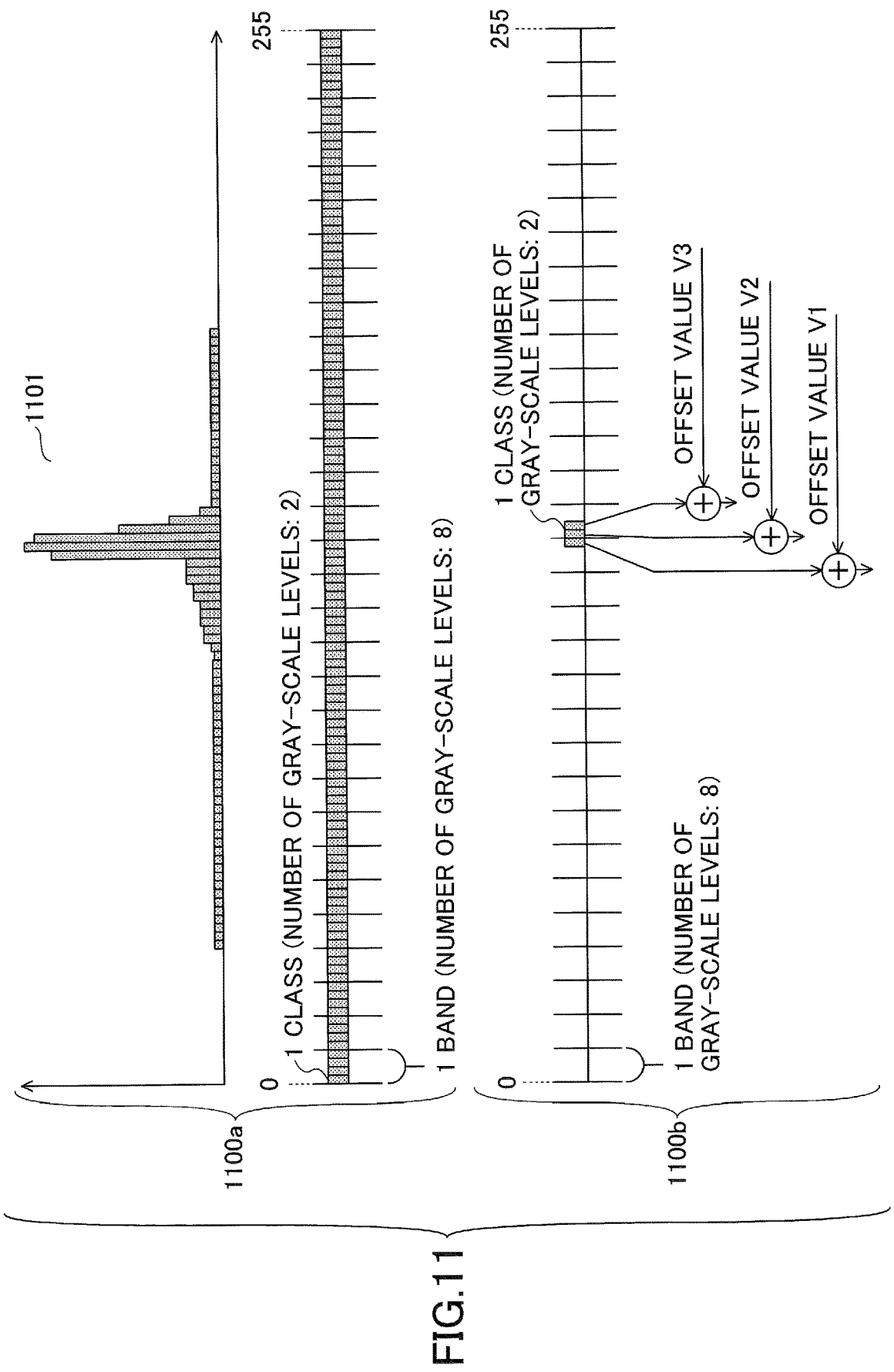
FIG. 11 is a first drawing illustrating a specific example of class offset processing performed by the encoder according to the first embodiment.

FIG. 11 is a first drawing illustrating a specific example of class offset processing performed by the encoder according to the first embodiment.

The example shown in 1100a of FIG. 11 illustrates that, when the gray-scale range of possible pixel values of the color difference signal (Cr) in the decoded image of a block being processed is comprised of 256 gray-scale levels, the pixel count unit 1011 equally divides the 256 gray-scale levels into 128 classes for the picture 710 being decoded. This results in each class consisting of 2 gray-scale levels.

The example shown in 1100a of FIG. 11 further illustrates that the pixel count unit 1011 classifies each pixel included in the decoded image of the CTU block 720 into one of the classes based on the color-difference-signal-(Cr) pixel value, thereby generating a histogram 1101.

The example shown in 1100b of FIG. 11 illustrates that the class select unit 1012 selects the top three classes having the largest number of counted pixels. The example shown in 1100b of FIG. 11 also illustrates that the pixel value change unit 1014 adds offset values V1, V2, and V3 to the color-difference-signa-(Cr) pixel values of pixels belonging to the selected three classes.

As an alternative to the example shown in 1100b of FIG. 11, the class select unit 1012 may select 6 classes around the median value of the gray-scale range by default, followed by selecting 3 classes.

In the example shown in FIG. 11 as described above, the class offset processing unit 1001 performs class offset processing for the decoded image of the CTU block 720 in the following manner.

The offset value is added to classes each consisting of 2 gray-scale levels, which is narrower than the bands of 8 gray-scale levels.

A parameter corresponding to the band position is not used, and the target area in which offset values are added is selected based on the number of pixels belonging to each class. Alternatively, without using a parameter corresponding to the band position, an area around the median value of the gray-scale range may be selected by default, and the target area to which offset values are added may be selected based on the number of pixels belonging to each relevant class.

The number of classes in the target area in which offset values are added is three.

In this manner, the class offset processing unit 1001 may add offset values to the color difference signal (Cr) only at a specific area having the occurrence of small deterioration in the decoded image of the CTU block 720. This arrangement increases the effect of improving color shift, compared with band offset processing performed by a general encoder.

Further, the class offset processing unit 1001 does not need transmit parameters corresponding to band positions to a decoder as part of the SAO parameters. This arrangement reduces the number of bits of the SAO parameters transmitted to a decoder, compared with band offset processing performed by a general encoder.

Moreover, the class offset processing unit 1001 enables the reduction of the number of offset values included in the SAO parameters. This arrangement further reduces the number of bits of the SAO parameters transmitted to a decoder, compared with band offset processing performed by a general encoder.

(1-2) Specific Example 2 of Class Offset Processing

Figure 12:
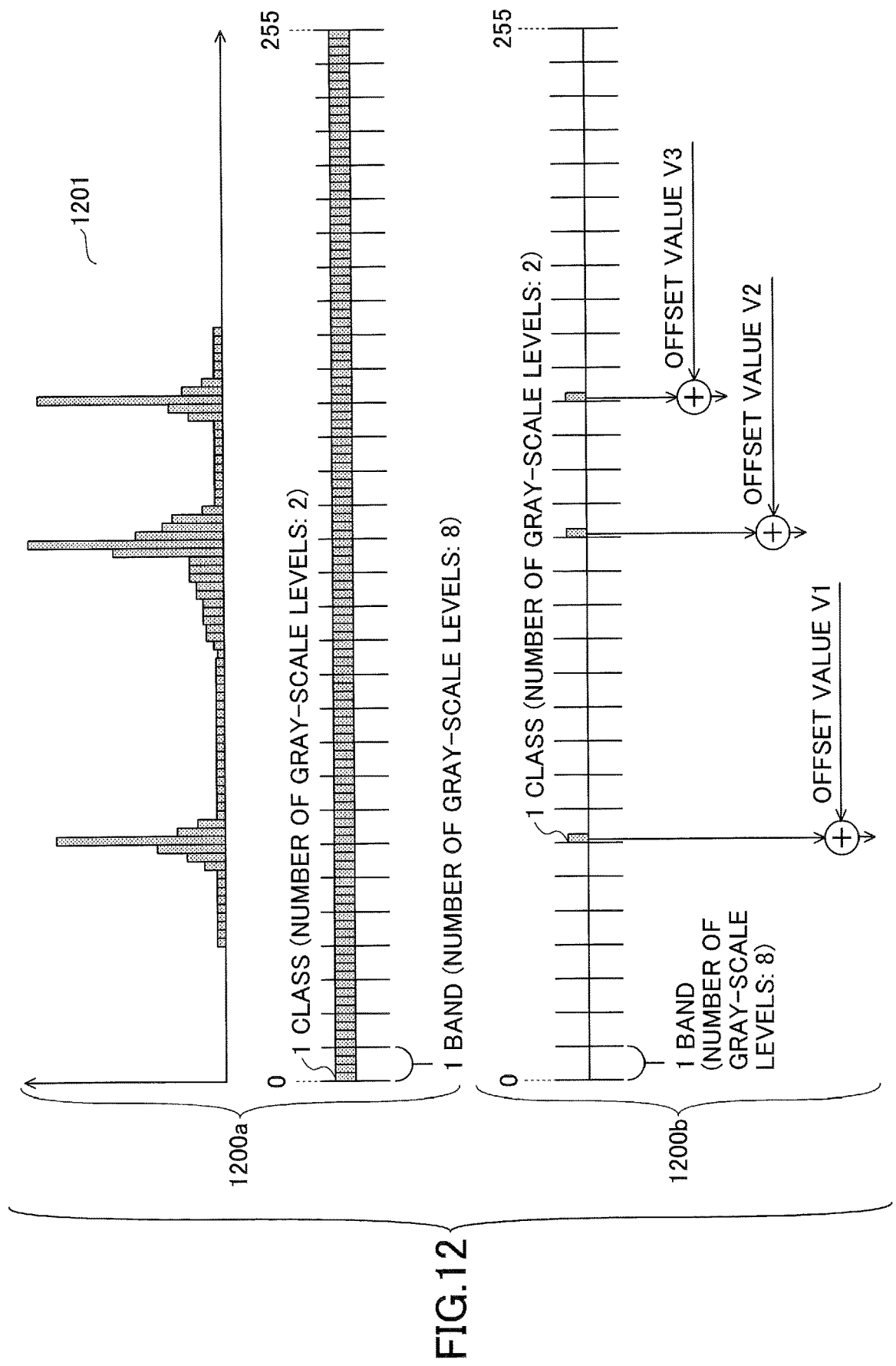
FIG. 12 is a second drawing illustrating a specific example of class offset processing performed by the encoder according to the first embodiment.

In the following, another specific example of the class offset processing will be described. FIG. 12 is a second drawing illustrating a specific example of class offset processing performed by the encoder according to the first embodiment.

The example shown in 1200a of FIG. 12 illustrates, similarly to the example shown in 1100a of FIG. 11, that the pixel count unit 1011 classifies each pixel included in the decoded image of the CTU block 720 into one of the classes based on the color-difference-signal-(Cr) pixel value, thereby generating a histogram 1201. The difference from 1100a of FIG. 11 is that the top three classes having the largest number of counted pixels are not consecutive.

As illustrated in 1200b of FIG. 12, the class select unit 1012 selects the top three classes having the largest number of counted pixels regardless of whether or not these top three classes are consecutive. The pixel value change unit 1014 adds offset values V1, V2, and V3 to the color-difference-signa-(Cr) pixel values of pixels belonging to the selected three classes.

As described above, the class offset processing unit 1001 performs the class offset processing in the same manner as in the above-described specific example 1, regardless of the distribution of values of pixels included in the decoded image of the CTU block 720, thereby providing substantially the same effect as in the specific example 1.

In addition, unlike the band offset process by a general encoder, offset values can be added to pixel values belonging to non-contiguous classes. Because of this, offset values can be added to areas such as an object area and a background area in which color difference values are significantly different, thereby increasing the effect of improving color shift.

(1-3) Specific Example 3 of Class Offset Processing

Figure 13:
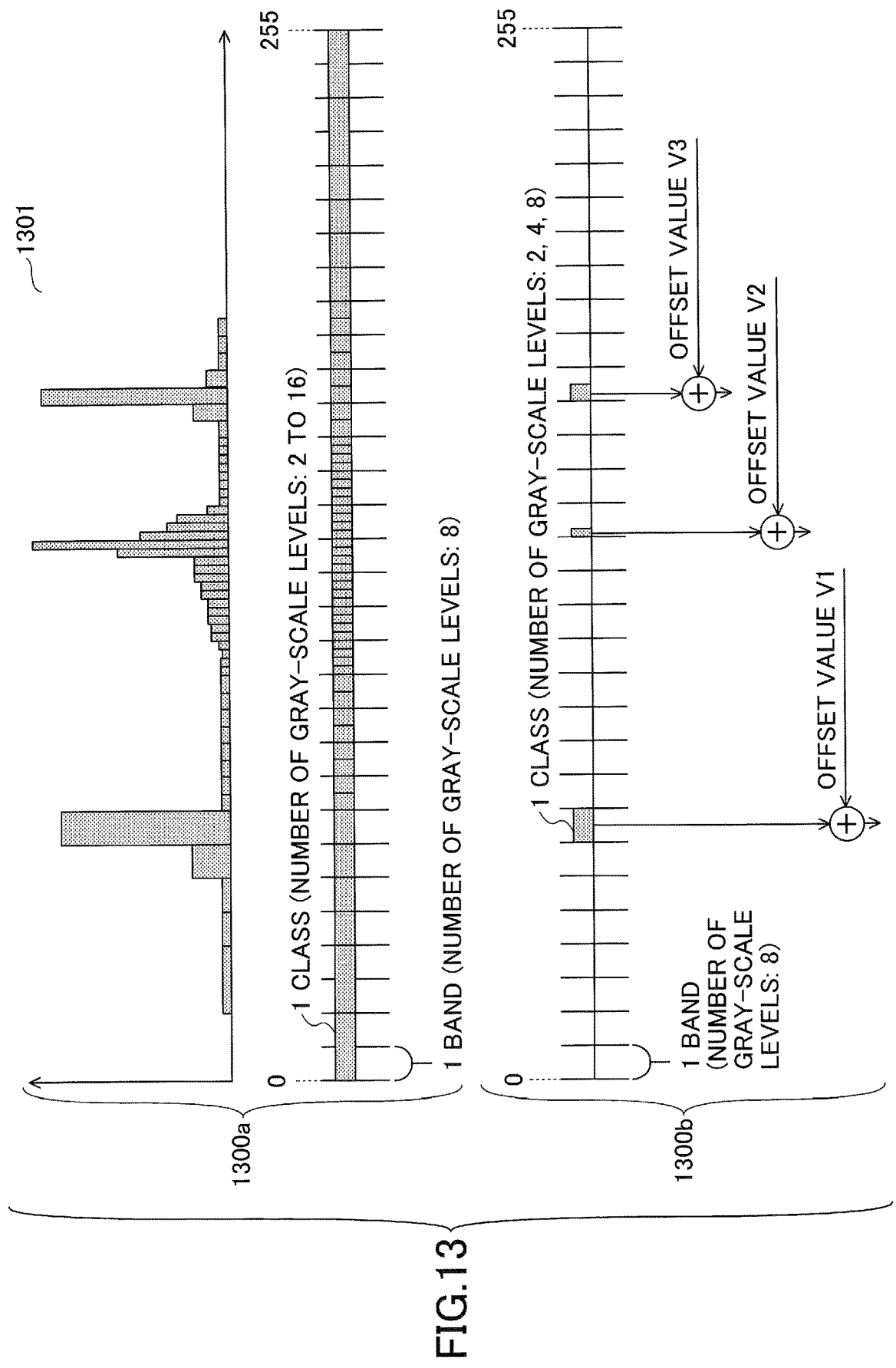
FIG. 13 is a third drawing illustrating a specific example of class offset processing performed by the encoder according to the first embodiment.

In the following, another specific example of the class offset processing will be described. FIG. 13 is a third drawing illustrating a specific example of class offset processing performed by the encoder according to the first embodiment.

The example shown in 1300a of FIG. 13 illustrates that, when the gray-scale range of possible pixel values of the color difference signal (Cr) in the decoded image of a block being processed is comprised of 256 gray-scale levels, the pixel count unit 1011 divides the 256 gray-scale levels into classes having the different numbers of gray-scale levels. Specifically, the pixel count unit 1011 produces a plurality of classes ranging from a class having 2 gray-scale levels to a class having 16 gray-scale levels.

The example shown in 1300a of FIG. 13 further illustrates that the pixel count unit 1011 classifies each pixel included in the decoded image of the CTU block 720 into one of the classes based on the color-difference-signal-(Cr) pixel value, thereby generating a histogram 1301. The difference from 1200a of FIG. 12 is that the top three classes having the largest number of counted pixels have respective, different numbers of gray-scale levels (i.e., 2, 4, and 6 gray-scale levels).

As illustrated in 1300b of FIG. 13, the class select unit 1012 selects the top three classes having the largest number of counted pixels regardless of whether or not these top three classes have the same number of gray-scale levels. The pixel value change unit 1014 adds offset values V1, V2, and V3 to the color-difference-signa-(Cr) pixel values of pixels belonging to the classes selected by the class select unit 1012. Alternatively, when the top three classes have respective, different numbers of gray-scale levels, top three classes having the largest number of counted pixels may be selected from the classes that belong to the gray-scale levels having the largest number of counted pixels.

As described above, the class offset processing unit 1001 performs the class offset processing in the same manner as in the above-described specific example (i.e., specific example 1), regardless of whether or not every class has the same number of gray-scale levels, thereby providing substantially the same effect as in the specific example 1.

In addition, unlike the band offset processing by a general encoder, the number of gray-scale levels to which offset values are added may be made different for different gray-scale levels, which enhances the effect of improving color shift.

(1-4) Specific Example 4 of Class Offset Processing

The above-noted examples (1-1) to (1-3) (i.e., specific examples 1 to 3) have been described with respect to a case in which the class select unit 1012 selects the top three classes having the largest number of counted pixels. Notwithstanding this, the number of selected classes may not be limited to this example, and top four or more classes (e.g., top four classes or top six classes) may be selected, for example.

Further, the above-noted examples (1-1) and (1-2) have been described with respect to a case in which the gray-scale range of possible pixel values of the color difference signal (Cr) in the decoded image of a block being processed is 256 gray-scale levels, and is divided into classes each having 2 gray-scale levels for the picture 710 being decoded.

In the picture 710 being decoded, the possible pixel values of the color difference signal (Cr) in the decoded image of a block being processed may have 512 gray-scale levels from 0 to 511, for example. In this case, the pixel count unit 1011 may perform partitioning such that each class has 4 gray-scale levels. Namely, in the case of equal-size partitioning, the number of gray-scale levels that each class has may be changed according to the gray-scale range. For example, the bit depth of possible pixel values of the color difference signal (Cr) in the decoded image of a block being processed may be set to BD in the picture 710 being decoded (i.e., the pixel values of the color difference signal (Cr) are represented in $2^{BD}$ gray-scale levels). In this case, the pixel count unit 1011 may perform partitioning such that the number of gray-scale levels of each class is $2^{(BD-7)}$. Here, BD is an integer greater than or equal to 8.

(2) Flow of Class Offset Processing

Figure 14:
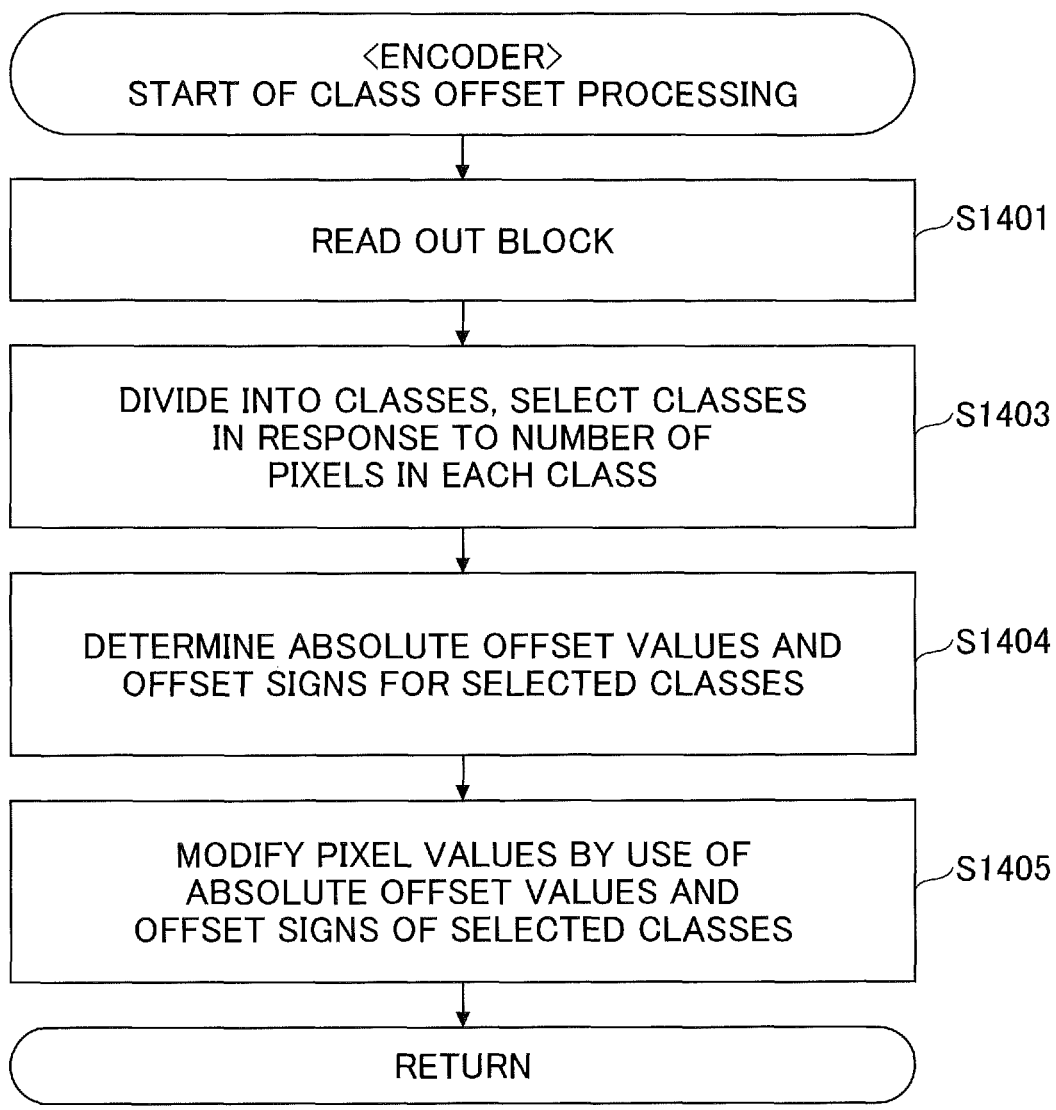
FIG. 14 is a flowchart illustrating the flow of class offset processing performed by the encoder according to the first embodiment.

In the following, the detailed flow of class offset processing by the encoder 110 according to the first embodiment will be described, which is an alternative to the band offset processing (step S605 in FIG. 6) performed by a general encoder. FIG. 14 is a flowchart illustrating the flow of class offset processing by the encoder according to the first embodiment.

In step S1401, the block read unit 541 reads out the decoded image of a block being processed among the decoded images of blocks received by the sample adaptive offset processing unit 520.

In step S1403, the pixel count unit 1011 divides the gray-scale range of each color component in the decoded image of a block being processed into a plurality of classes each having a predetermined number of gray-scale levels. The pixel count unit 1011 classifies, for each color component, each pixel included in the decoded image of a block being processed into one of the classes based on the pixel value, followed by counting the number of pixels belonging to each class. The class select unit 1012 then selects, for each color component, the top n classes having the largest number of counted pixels. Alternatively, when the color component is a color difference signal (Cb, Cr), the class select unit 2012 selects m classes at and around the median value (1<<(bitdepth−1)) of the gray-scale range, and selects the top n classes having the largest number of counted pixels from the m classes.

In step S1404, the offset select unit 1013 determines n absolute offset values and n offset signs for each color component as offset values to be added to the pixel values belonging to the selected n classes.

In step S1405, the pixel value change unit 1014 adds, for each color component, the determined n offset values (i.e., the n absolute offset values and the n offset signs) to the pixel values belonging to the selected n classes.

<4.7 Details of Signaling Process by First Embodiment Encoder>

Figure 15:
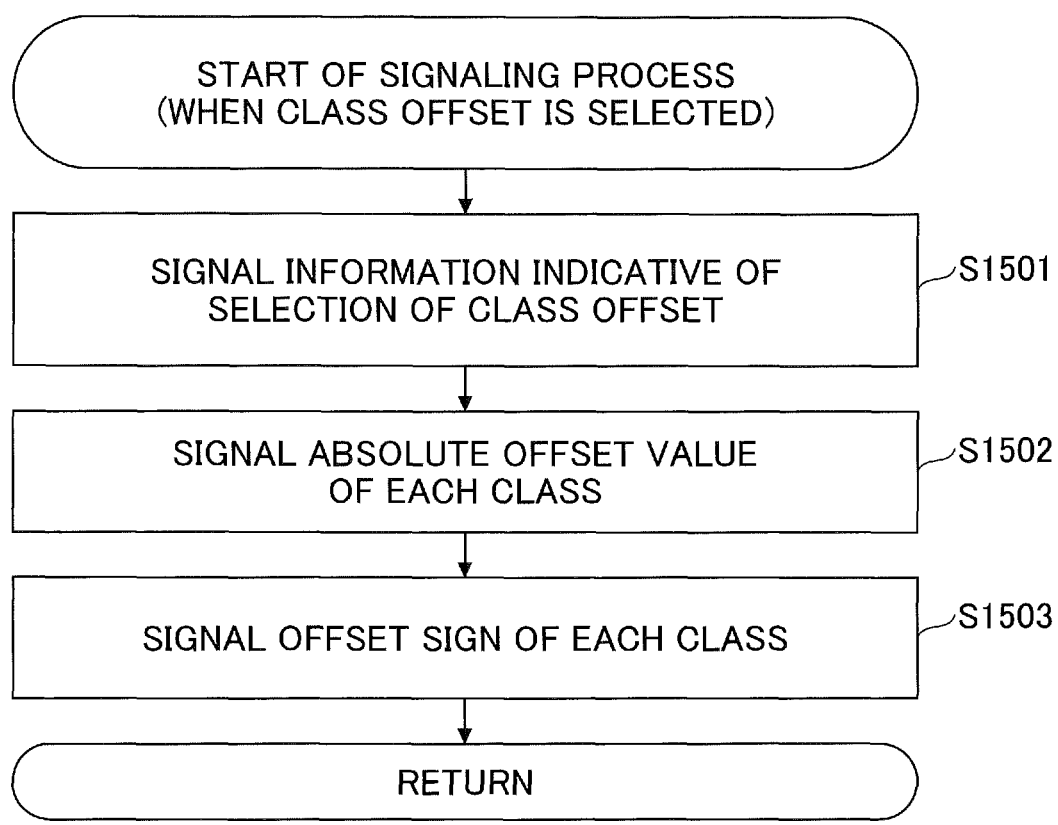
FIG. 15 is a flowchart illustrating the flow of a signaling process performed by the encoder according to the first embodiment.

In the following, the details of a signaling process performed by the encoder 110 according to the first embodiment will be described. FIG. 15 is a flowchart illustrating the flow of a signaling process performed by the encoder of the first embodiment. The following description will be directed to a case in which the comparison of RD costs by the select unit 1002 indicates that the result of class offset processing obtained by using the SAO parameters relating to the class offset processing is the processing result having the lowest RD cost.

In step S1501, the select unit 1002 signals information indicating that the result of class offset processing is selected in the sample adaptive offset processing.

In step S1502, the select unit 1002 signals the absolute offset values of the n classes derived for each color component among the SAO parameters used in the calculation of the processing result having the lowest RD cost.

In step S1503, the select unit 1002 signals the offset signs of the n classes derived for each color component among the SAO parameters used in the calculation of the processing result having the lowest RD cost.

<5. Functional Configuration of Decoder>

Figure 16:
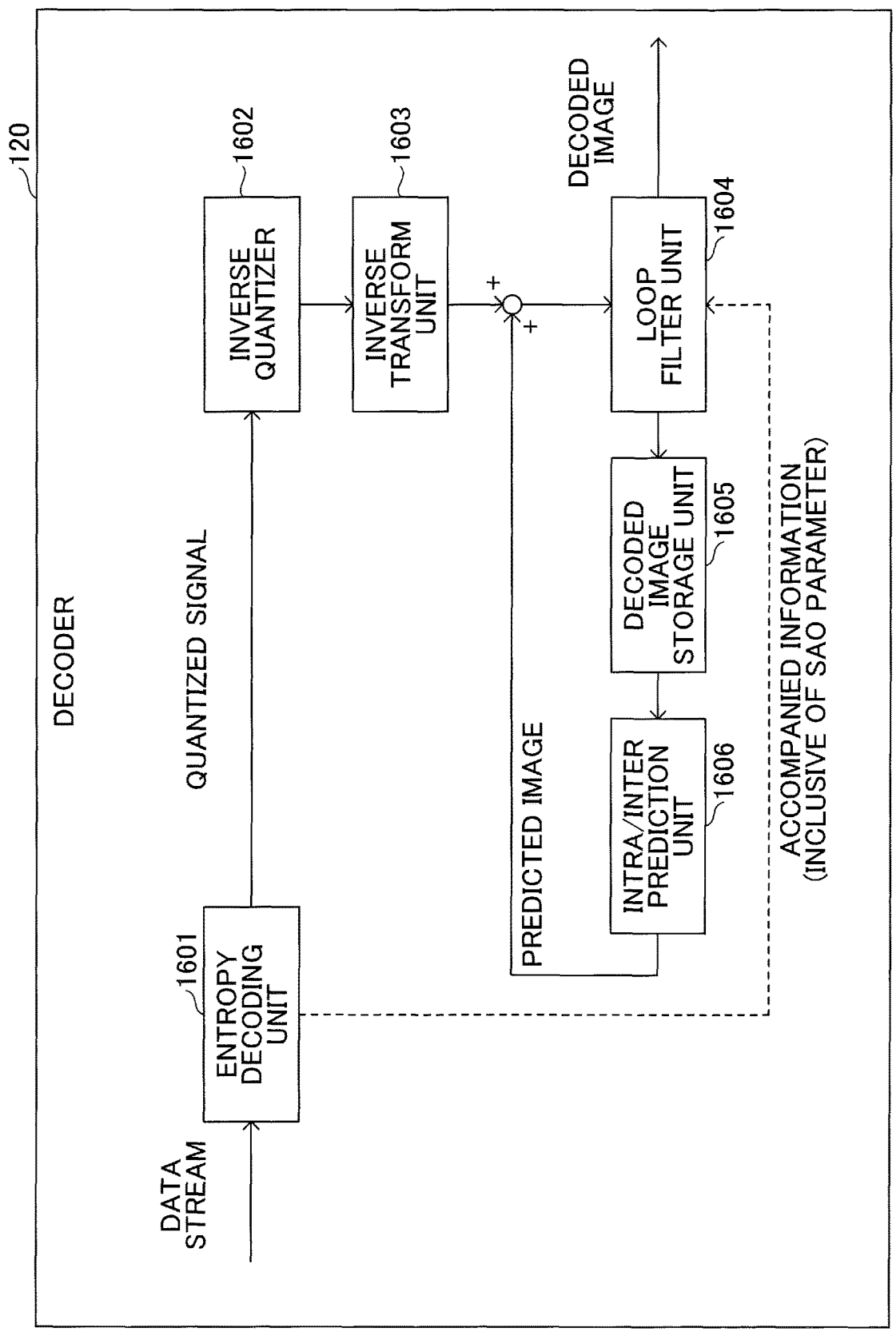
FIG. 16 is a drawing illustrating an example of the functional configuration of a decoder.

In the following, the functional configuration of the decoder 120 implemented by executing a decoding program will be described. FIG. 16 is a drawing illustrating an example of the functional configuration of the decoder. As illustrated in FIG. 16, the decoder 120 includes an entropy decoding unit 1601, an inverse quantizer 1602, an inverse transform unit 1603, a loop filter unit 1604, a decoded image storage unit 1605, and an intra/inter prediction unit 1606.

The entropy decoding unit 1601 decodes a received data stream to produce a quantized signal. Further, the entropy decoding unit 1601 extracts accompanied information (inclusive of the SAO parameters used in the loop filter unit 1604) from the data stream for provision to the loop filter unit 1604.

The inverse quantizer 1602 performs inverse-quantization with respect to the quantized signal for provision to the inverse transform unit 1603. The inverse transform unit 1603 performs an inverse orthogonal transformation with respect to the inversely quantized version of the quantized signal.

The signal obtained by the inverse transform unit 1603 performing inverse orthogonal transformation is added to a predicted image generated by the intra/inter prediction unit 1606 to generate a decoded image, which is then supplied to the loop filter unit 1604.

The loop filter unit 1604 uses the provided accompanied information to perform filtering to reduce the encoding noise of the supplied decoded image. The loop filter unit 1604 further includes a deblocking filter unit, a sample adaptive offset processing unit, and an adaptive loop filter unit (the details of which will be described later).

The loop filter unit 1604 outputs the filtered decoded image as a decoding result, and also stores this image in the decoded image storage unit 1605.

The intra/inter prediction unit 1606 uses the decoded images of CU blocks in the picture being decoded to perform intra prediction that generates a predicted image of the CU block being processed. The intra/inter prediction unit 1606 also performs inter-picture motion compensation by using the decoded image of each CU block in one or more reference pictures, thereby performing inter prediction that generates a predicted image of the CU block being processed.

Moreover, the intra/inter prediction unit 1606 outputs either an intra prediction image which is a predicted image of each CU block generated by the intra prediction or an inter prediction image which is a predicted image of each CU block generated by the inter prediction for motion compensation. The output predicted image is added to the signal produced by the inverse transform unit 1603 for provision as a decoded image to the loop filter unit 1604.

<6. Description of Loop Filter Unit>

In the following, the details of the loop filter unit 1604 of the decoder 120 will be described. Before describing the details of the loop filter unit 1604 of the decoder 120, however, a loop filter unit of a general decoder (in H.265/HEVC) will be described in detail in order to provide a reference for comparison. In the following, the descriptions in "6.1" to "6.3" will be regarding the details of a loop filter unit of a general decoder. Thereafter, the descriptions in "6.4" and "6.5" will provide the details of the loop filter unit 1604 of the decoder 120 according to the first embodiment.

<6.1 Functional Configuration of Loop Filter Unit of General Decoder>

Figure 17:
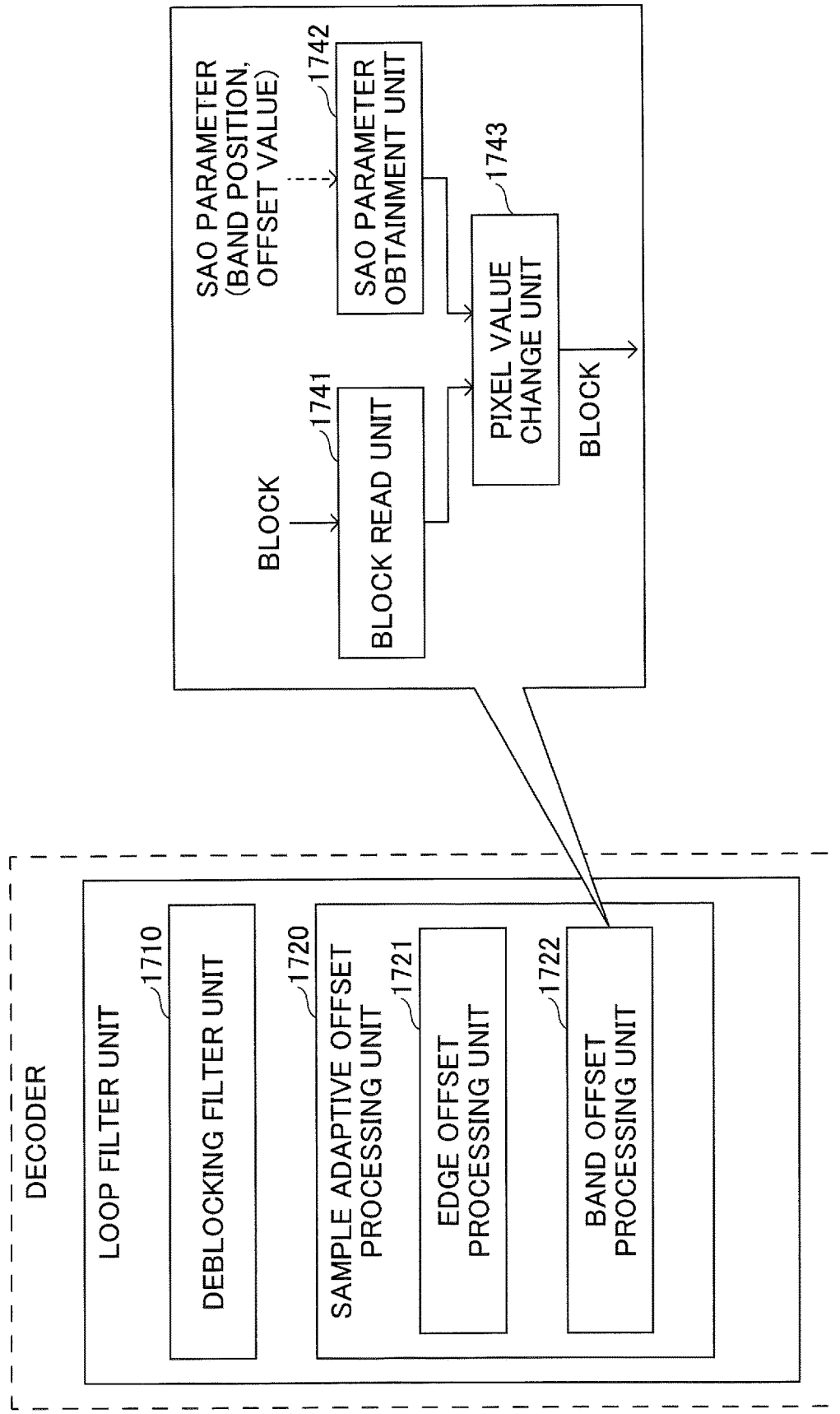
FIG. 17 is a drawing illustrating an example of the functional configuration of a loop filter unit of a general decoder.

FIG. 17 is a drawing illustrating an example of the functional configuration of a loop filter unit of a general decoder. As illustrated in FIG. 17, the loop filter unit includes a deblocking filter unit 1710 and a sample adaptive offset processing unit 1720.

The deblocking filter unit 1710 performs filtering on the decoded image of a block being processed to reduce distortion generated at the block boundaries when the input image of each CU block in an input picture is encoded by the encoder. The sample adaptive offset processing unit 1720 classifies, on a pixel-specific basis, the decoded image of a block being processed that has been filtered by the deblocking filter unit 1710, and adds an offset value responsive to the classification to each pixel.

It may be noted that the sample adaptive offset processing unit 520 includes an edge offset processing unit 1721 and a band offset processing unit 1722, and uses either one of the processing units based on the accompanied information sent from the entropy decoding unit 1601.

The edge offset processing unit 1721 classifies an edge state based on the relationship between the sizes of pixel values of three consecutive pixels aligned in the direction specified as an edge offset class. The edge offset processing unit 1721 further adds an offset value responsive to the classification of an edge state to a pixel value of the decoded image of a block being processed.

The band offset processing unit 1722 divides the gray-scale range of possible pixel values for the decoded image of a block being processed into 32 bands, and selects 4 consecutive bands based on a band position selected from these 32 bands. The band offset processing unit 1722 adds (or subtracts) an offset value to the pixel value of a pixel belonging to any of the 4 bands.

Specifically, as illustrated on the right-hand side of FIG. 17, the band offset processing unit 1722 includes a block read unit 541, an SAO parameter obtainment unit 1742, and a pixel value change unit 1743. The block read unit 1741 reads out the decoded image of a block being processed among the decoded images of blocks received by the sample adaptive offset processing unit 1720 for provision to the pixel value change unit 1743. The SAO parameter obtainment unit 1742 divides the gray-scale range of possible pixel values for the decoded image of a block being processed into 32 bands, and obtains SAO parameters (band positions and offset values) relevant to the band offset processing for outputting to the pixel value change unit 1743.

The pixel value change unit 1743 uses the SAO parameters relating to band offset processing received from the SAO parameter obtainment unit 1742 to change the pixel values of each color component (i.e., the brightness signal (Y) and the color difference signals (Cb and Cr)) of the decoded image of a block being processed. The pixel value change unit 1743 then outputs the decoded image of a block being processed in which the pixel values have been changed.

The adaptive loop filter unit 530 performs filtering with respect to the decoded image of a block being processed which has undergone the offset processing performed by the sample adaptive offset processing unit 520, thereby reducing errors relative to the corresponding input image.

<6.2 Flow of Sample Adaptive Offset Processing by Sample Adaptive Offset Processing Unit of General Decoder>

Figure 18:
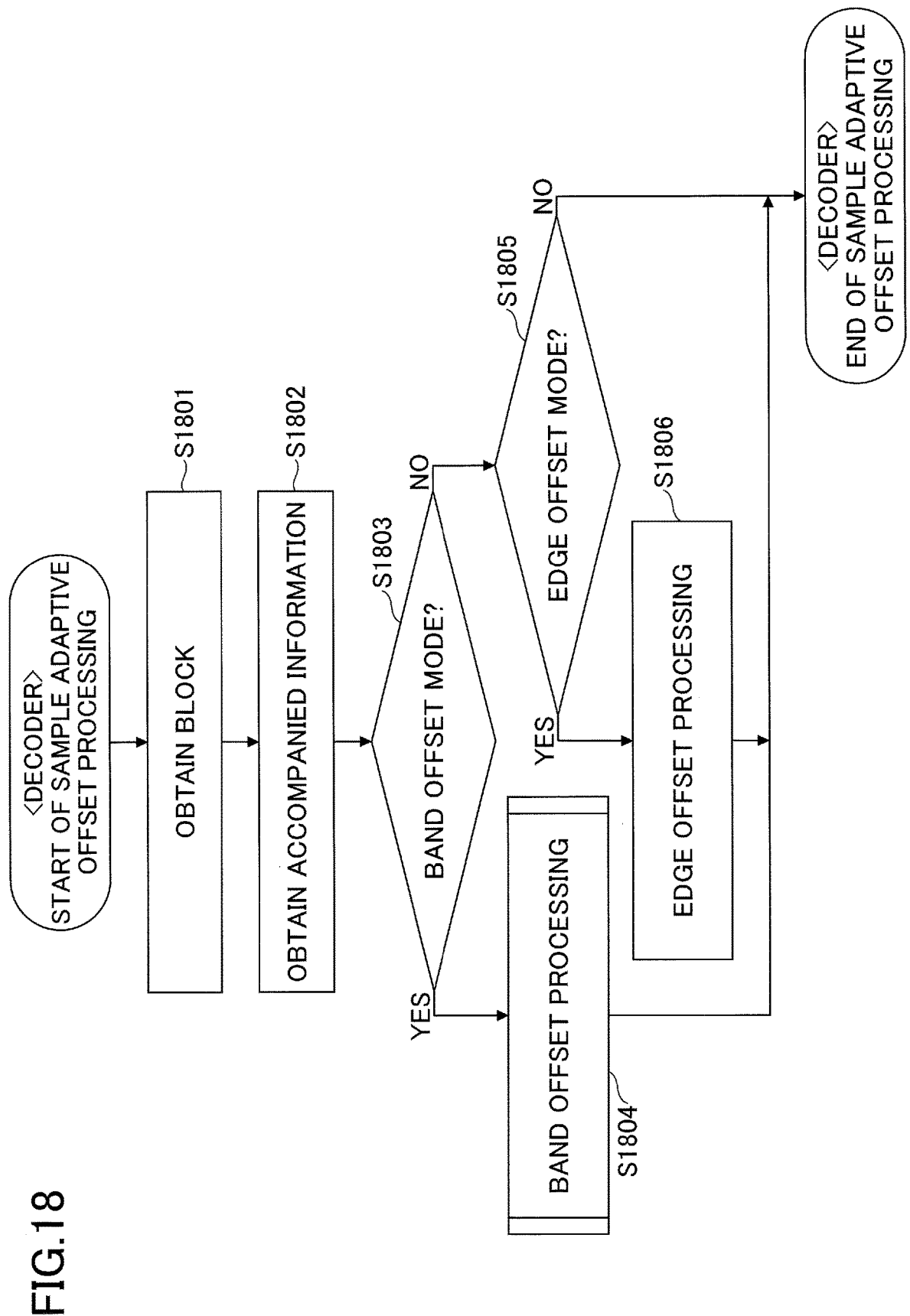
FIG. 18 is a flowchart illustrating the flow of sample adaptive offset processing performed by a general decoder.

In the following, the flow of sample adaptive offset processing performed by the sample adaptive offset processing unit 1720 of a general decoder will be described. FIG. 18 is a flowchart illustrating the flow of sample adaptive offset processing performed by a general decoder.

Upon the completion of deblocking filtering of a block being processed by the deblocking filter unit 1710, the sample adaptive offset processing unit 1720 starts the sample adaptive offset processing illustrated in FIG. 18. It may be noted that, for the sake of convenience of explanation, the processing for one block being processed will be described.

In step S1801, the sample adaptive offset processing unit 1720 receives a block to be processed.

In step S1802, the sample adaptive offset processing unit 1720 receives the accompanied information from the entropy decoding unit 1601.

In step S1803, the sample adaptive offset processing unit 1720 checks, based on the received accompanied information, whether the offset mode is a band offset mode. Upon determining in step S1803 that the offset mode is a band offset mode (in the case of Yes in step S1803), the procedure proceeds to step S1804.

In step S1804, the band offset processing unit 1722 uses the SAO parameters relating to band offset processing contained in the accompanied information to perform band offset processing.

Upon determining in step S1803 that the offset mode is not a band offset mode (in the case of No in step S1803), the procedure proceeds to step S1805.

In step S1805, the sample adaptive offset processing unit 1720 checks whether the offset mode is an edge offset mode. Upon determining in step S1805 that the offset mode is an edge offset mode (in the case of Yes in step S1805), the procedure proceeds to step S1806.

In step S1806, the edge offset processing unit 1721 uses the SAO parameters relating to edge offset processing contained in the accompanied information to perform edge offset processing.

Upon determining in step S1805 that the offset mode is not an edge offset mode (in the case of No in step S1805), the offset mode is determined to be "off", and the sample adaptive offset processing for a block being processed comes to an end.

<6.3 Flow of Band Offset Processing by Band Offset Processing Unit of Sample Adaptive Offset Processing Unit of General Decoder>

Figure 19:
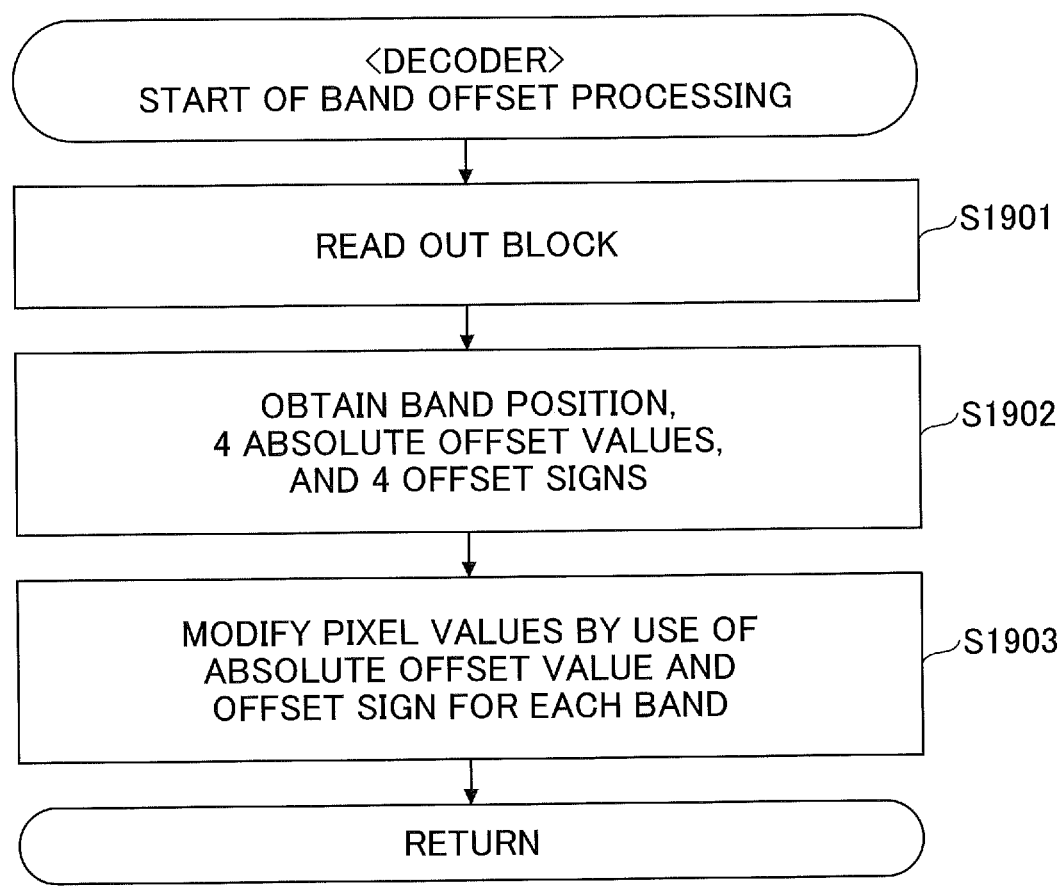
FIG. 19 is a flow chart illustrating the flow of band offset processing performed by a general decoder.

In the following, a detailed flowchart of the band offset processing (step S1804) performed by a general decoder will be described. FIG. 19 is a flowchart illustrating the flow of band offset processing performed by a general decoder.

In step S1901, the block read unit 1741 reads out the decoded image of a block being processed among the decoded images of blocks received by the sample adaptive offset processing unit 1720.

In step S1902, the SAO parameter obtainment unit 1742 obtains a band position, four absolute offset values, and four offset signs for each color component as the SAO parameters relating to band offset processing contained in the accompanied information.

In step S1903, the pixel value change unit 1743 uses the SAO parameters (i.e., the band position, the four absolute offset values, and the four offset signs) relating to band offset processing to change the pixel values of the decoded image of a block being processed for each color component.

<6.4 Functional Configuration of Loop Filter Unit of First Embodiment Decoder>

In the following, the functional configuration of the loop filter unit 1604 of the decoder 120 according to the first embodiment will be described.

Figure 20:
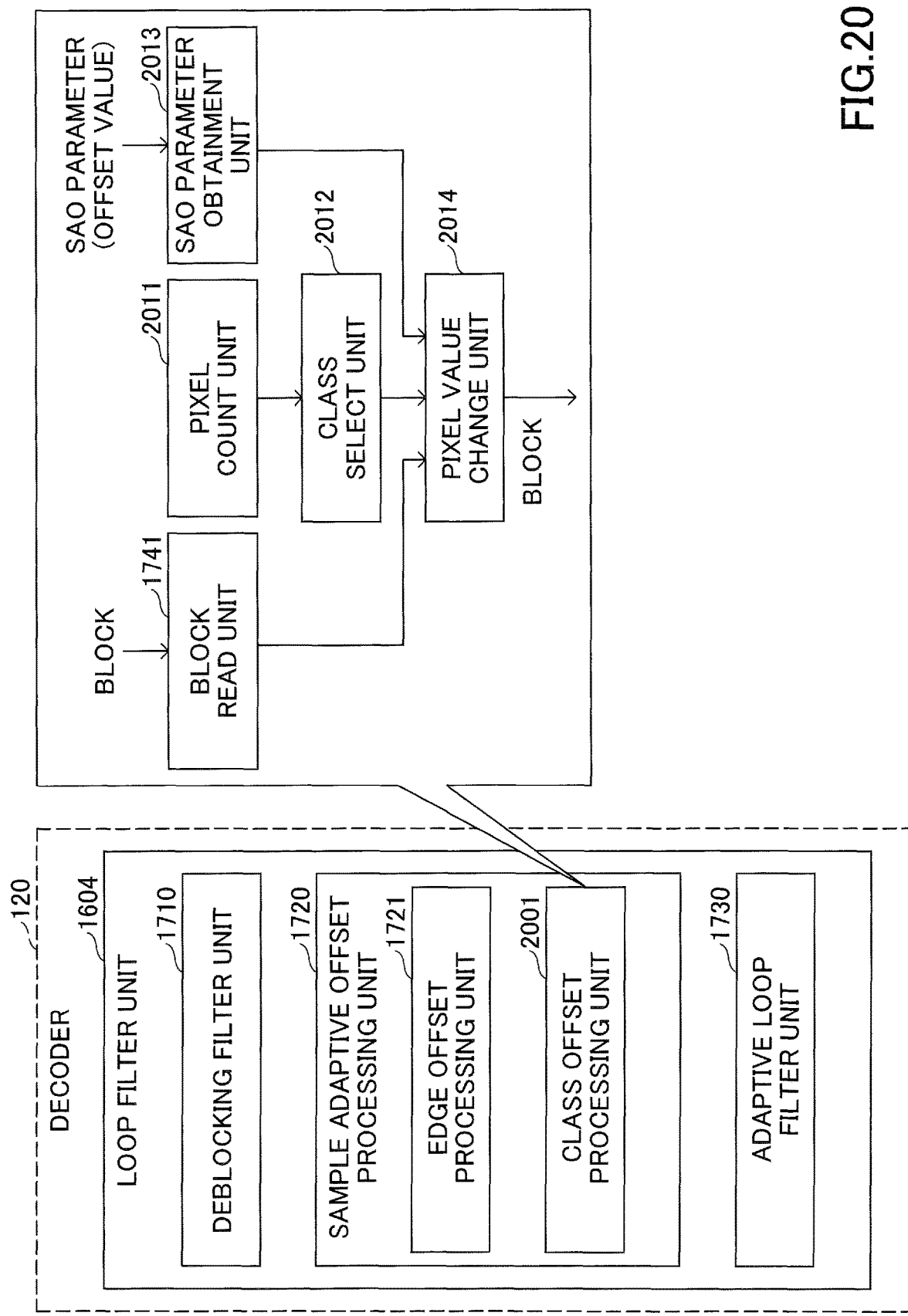
FIG. 20 is a drawing illustrating an example of the functional configuration of a loop filter unit of a decoder according to the first embodiment.

FIG. 20 is a drawing illustrating an example of the functional configuration of the loop filter unit of the decoder according to the first embodiment. The same or similar functions as those of the loop filter unit of a general decoder described with reference to FIG. 17 will be referred to by the same numerals, and a description thereof will be omitted.

The difference from FIG. 17 is that the sample adaptive offset processing unit 1720 has a class offset processing unit 2001. As will be described later, the class offset processing unit 2001, which may be capable of reducing color difference distortion, also serves as a CAR (chroma artifact reduction) SAO. As illustrated on the right-hand side of FIG. 20, the class offset processing unit 2001 includes a block read unit 1741, a pixel count unit 2011, a class select unit 2012, an SAO parameter obtainment unit 2013, and a pixel value change unit 2014.

The block read unit 1741 reads out the decoded image of a block being processed among the decoded images of blocks received by the sample adaptive offset processing unit 1720 for provision to the pixel value change unit 2014.

The pixel count unit 2011 is an example of the counting unit. The pixel count unit 2011 divides the gray-scale range of each color component (i.e., the brightness signal (Y) and the color difference signals (Cb and Cr)) in the decoded image of a block being processed into a plurality of classes each having a predetermined number of gray-scale levels. The pixel count unit 2011 may divide the gray-scale range such that each class has the same number of gray-scale levels, or such that each class has a different number of gray-scale levels.

The number of gray-scale levels of each class may be greater than, or less than, the number of gray-scale levels of each band (when the gray-scale range is 256 gray-scale levels, the number of gray-scale levels of each band is 8) when the band offset processing unit 1722 illustrated in FIG. 17 produces 32 divided bands.

It may be noted that the partitioning method used by the pixel count unit 2011 to generate each class is the same as the partitioning method used by the pixel count unit 1011 to generate each class in the encoder 110, and is a method determined in advance.

When the number of gray-scale levels of each class is smaller than the number of gray-scale levels of each band (i.e., when the bandwidth is narrowed), the offset values are added to a specific area having the occurrence of small deterioration within a block being processed. This arrangement increases the effect of improving color shift, compared with band offset processing performed by a general decoder.

The pixel count unit 2011 classifies each pixel included in the decoded image of a block being processed into one of the classes based on the pixel value, followed by counting the number of pixels belonging to each class.

The class select unit 2012 selects the top n classes (n: an integer greater than or equal to 1, such as 3) having the largest number of counted pixels for each color component for notification to the pixel value change unit 2014.

As an alternative example, when a color component of the decoded image of a block being processed is a color difference signal (Cb, Cr), the class select unit 2012 selects m classes (m: an integer greater than or equal to 1, such as 6) at and around the median value of the gray-scale range ($1<<(bitdepth-1)$), and selects the top n classes (n: an integer greater than or equal to 1, such as 3) having the largest number of counted pixels from the m classes, followed by notifying the pixel value change unit 1014.

It may be noted that the number of classes selected by the class select unit 2012 is the same as the number of classes selected by the pixel count unit 1011 in the encoder 110, and is a number determined in advance.

The SAO parameter obtainment unit 2013 obtains SAO parameters relating to class offset processing. According to the present embodiment, the SAO parameter obtainment unit 2013 obtains n offset values (i.e., n absolute offset values and n offset signs) for each color component as the SAO parameters. The SAO parameter obtainment unit 2013 notifies the pixel value change unit 2014 of the n obtained offset values for each color component.

The pixel value change unit 2014 is an example of a class addition unit. The pixel value change unit 2014 adds a received offset value for each color component to the pixel value of each pixel belonging to the classes selected by the class select unit 12 among the pixels included in the decoded image of a block being processed. The pixel value change unit 2014 outputs the decoded image of a block to be processed in which the offset values have been added for each color component.

<6.5 Details of Class Offset Processing by First Embodiment Decoder>

Figure 21:
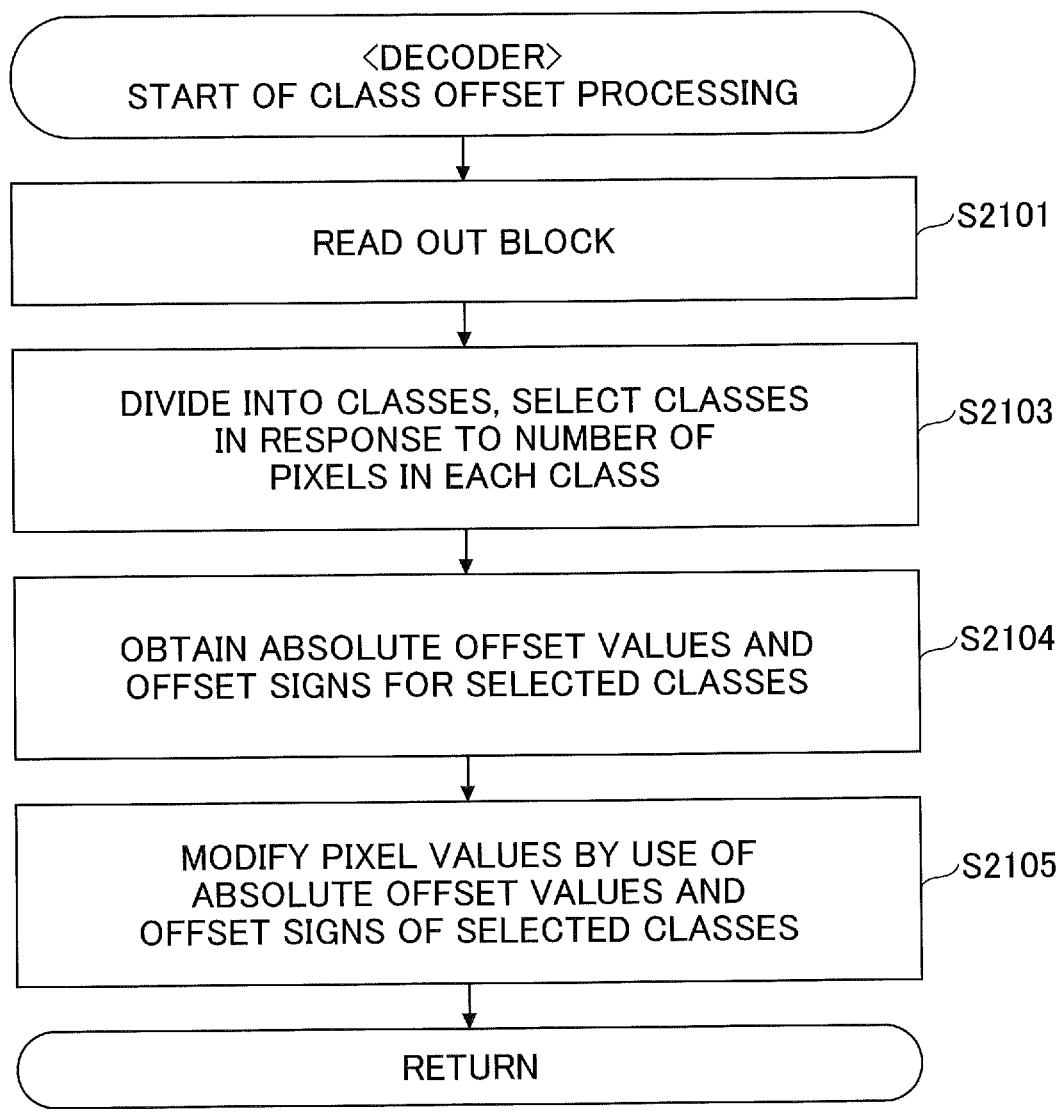
FIG. 21 is a flowchart illustrating the flow of class offset processing by the decoder according to the first embodiment.

In the following, the detailed flow of class offset processing performed by the decoder 120 of the first embodiment will be described as an alternative to the band offset processing (step S1804 in FIG. 18) performed by a general decoder. FIG. 21 is a flowchart illustrating the flow of class offset processing performed by the decoder according to the first embodiment.

In step S2101, the block read unit 1741 reads out the decoded image of a block being processed among the decoded images of blocks received by the sample adaptive offset processing unit 1720.

In step S2103, the pixel count unit 2011 divides the gray-scale range of each color component in the decoded image of a block being processed into a plurality of classes having a predetermined number of gray-scale levels. The pixel count unit 2011 classifies, for each color component, each pixel included in the decoded image of a block being processed into one of the classes based on the pixel value, followed by counting the number of pixels belonging to each class. Further, the class select unit 2012 selects the top n classes having the largest number of counted pixels for each color component. As an alternative example, when the color component is a color difference signal (Cb, Cr), the class select unit 2012 selects m classes at and around the median value of gray-scale levels (1<<(bitdepth−1)), and selects the top n classes having the largest number of counted pixels from the m classes.

In step S2104, the SAO parameter obtainment unit 2013 obtains the offset values (i.e., n absolute offset values and n offset signs) of the n respective classes for each color component as the SAO parameters included in the accompanied information.

In step S2105, the pixel value change unit 2014 adds the n obtained offset values (i.e., n absolute offset values and n offset signs) to the pixel values of pixels belonging to the n selected classes for each color component.

<7. Summary>

As is obvious from the descriptions that have been provided heretofore, the sample adaptive offset processing unit of the encoder 110 according to the first embodiment has a class offset processing unit in place of a band offset processing unit. The class offset processing unit operates as follows.

The gray-scale range of each color component in the decoded image of a block being processed is divided into a plurality of classes each having a predetermined number of gray-scale levels.

The number of pixels belonging to each of the plurality of classes is counted, and the top n classes having the largest number of counted pixels are selected, followed by adding offset values to the n selected classes. Alternatively, classes at and around the median value of gray-scale levels may be selected by default, and the number of pixels belonging to each of the selected classes may be counted, followed by selecting the top n classes having the largest number of counted pixels, and then adding offset values to the n selected classes.

The SAO parameters inclusive of the added offset values are signaled and transmitted to the decoder.

Selecting classes according to the number of pixels for adding offset values allows the encoder 110 of the first embodiment to eliminate the need to transmit a band position to the decoder as one of the SAO parameters. As a result, the number of bits of the SAO parameters is reduced.

Moreover, the class offset processing unit of the encoder 110 according to the first embodiment performs class offset processing while ensuring the following.

Reducing the number of selected classes (to less than four) allows the number of absolute offset values and the number of offset signs included in the SAO parameters to be reduced. This arrangement further reduces the number of bits representing the SAO parameters.

Reducing the number of gray-scale levels in each class allows the offset values to be added only to a specific area having the occurrence of small degradation. This arrangement increases the effect of improving color shift.

Similarly, the sample adaptive offset processing unit of the decoder 120 according to the first embodiment has a class offset processing unit in place of a band offset processing unit. The class offset processing unit operates as follows.

The gray-scale range of each color component in the decoded image of a block being processed is divided into a plurality of classes each having a predetermined number of gray-scale levels.

The number of pixels belonging to each of the plurality of classes is counted, and the top n classes having the largest number of counted pixels are selected, followed by adding offset values to the n selected classes. Alternatively, classes at and around the median value of gray-scale levels may be selected by default, and the number of pixels belonging to each of the selected classes may be counted, followed by selecting the top n classes having the largest number of counted pixels, and then adding offset values to the n selected classes.

The offset values are received from the encoder as the SAO parameters.

Selecting classes according to the number of pixels for adding offset values allows the decoder 120 of the first embodiment to eliminate the need to receive a band position through the SAO parameters. As a result, the number of bits of the SAO parameters is reduced.

Moreover, the class offset processing unit of the decoder 120 according to the first embodiment performs class offset processing while ensuring the following.

Reducing the number of selected classes (to less than four) allows the number of absolute offset values and the number of offset signs included in the SAO parameters to be reduced. This arrangement further reduces the number of bits representing the SAO parameters.

Reducing the number of gray-scale levels in each class allows the offset values to be added only to a specific area having the occurrence of small degradation. This arrangement increases the effect of improving color shift.

Second Embodiment

In the first embodiment, the sample adaptive offset processing unit has a class offset processing unit in place of a band offset processing unit. Further, the first embodiment has been directed to a case in which substantially the same offset processing is performed for each color component in the decoded image of a block being processed.

The configuration of the sample adaptive offset processing unit is not limited to the above-noted one. For example, the configuration may be such that a class offset processing unit is provided in addition to a band offset processing unit. Moreover, the configuration may be such that either band offset processing or class offset processing is selectively performed for each color component. In the following, the second embodiment will be described with the focus on the differences from the first embodiment.

Figure 22:
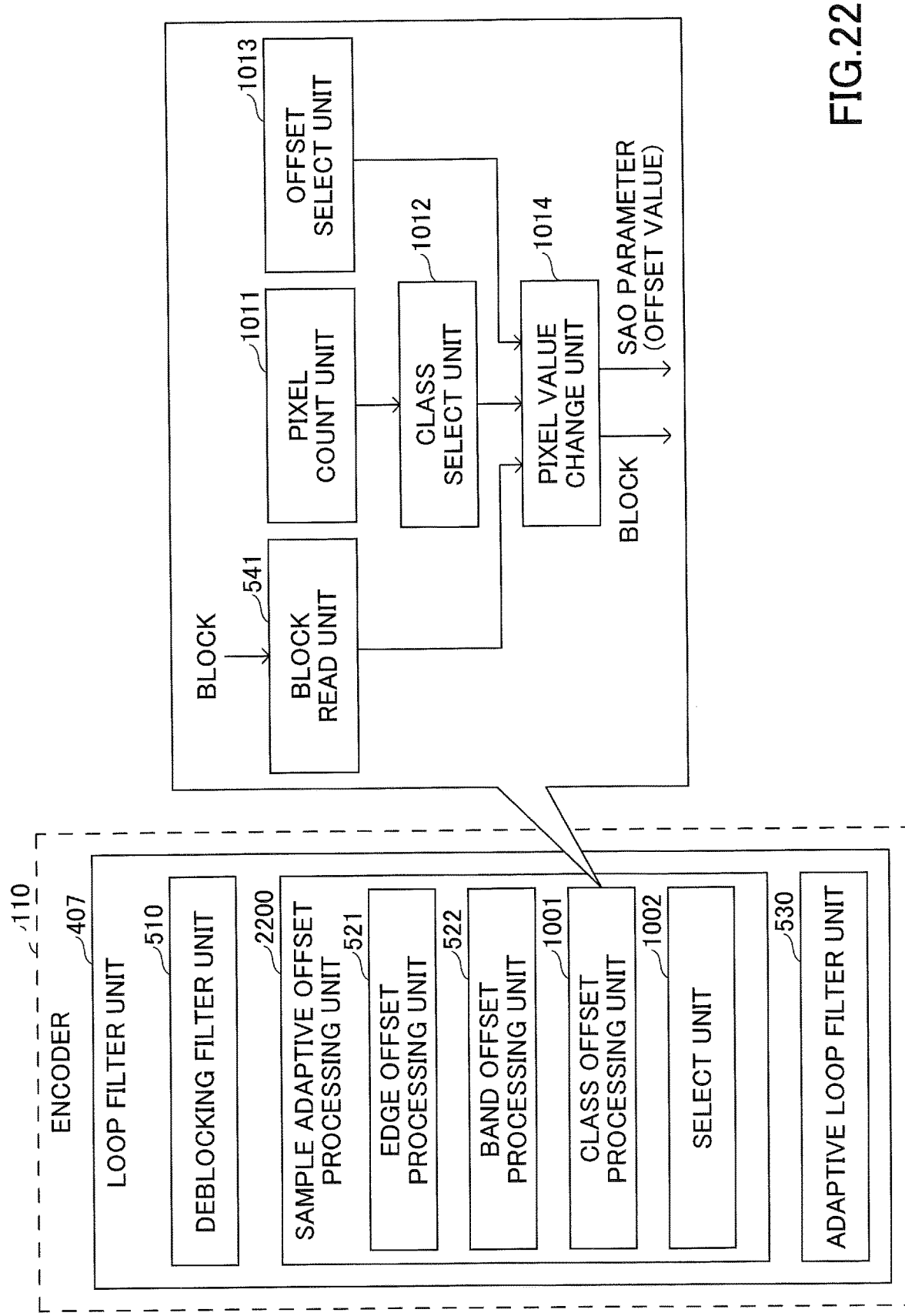
FIG. 22 is a drawing illustrating an example of the functional configuration of a loop filter unit of an encoder according to a second embodiment.

FIG. 22 is a drawing illustrating an example of the functional configuration of a loop filter unit of an encoder according to the second embodiment. The difference from the functional configuration illustrated in FIG. 10 is that the sample adaptive offset processing unit 2200 includes a band offset processing unit 522 in addition to the edge offset processing unit 521, the class offset processing unit 1001, and the select unit 1002.

Based on the functional configuration illustrated in FIG. 22, the sample adaptive offset processing unit 2200 controls the band offset processing unit 522 such that band offset processing is performed selectively for the brightness signal (Y) among the color components. Further, the class offset processing unit 1001 is controlled such that class offset processing is performed selectively for the color difference signals (Cb and Cr). It may be noted that which one of the band offset processing and the class offset processing is performed for a given one of the color components is determined in advance.

FIG. 22 illustrates the functional configuration of the loop filter unit of the encoder 110. The loop filter unit of the decoder 120 may similarly be configured.

As described above, the configuration may be such that different offset processing is applied on a color-component-specific basis, which increases the effect of improving color shift.

Other Embodiments

In the first and second embodiments described heretofore, specific reference has not been made to the order in which n offset values are transmitted, and it may suffice for the n offset values to be transmitted in the order that is determined in advance. For example, the select unit 1002 may be configured to transmit the n offset values in a descending order of the number of pixels in a class. Alternatively, the select unit 1002 may be configured to transmit the n offset values in a descending or ascending order of the size of gray-scale values in a class. Alternatively, the select unit 1002 may be configured to transmit the n offset values in an ascending order of the distance from the median value to the gray-scale values of a class.

The first and second embodiments have been described with respect to a case in which the top n classes having the largest number of counted pixels are selected. In some cases, n or more classes may have the same number of counted pixels.

In such a case, the class select unit 1012 does not include some of the classes having the same number of counted pixels in the group of selected classes so that the number of selected classes becomes equal to n. For example, classes having the same number of pixels may be compared with each other, thereby excluding one or more classes whose gray-scale values are the farthest away from the median value.

The first and second embodiments have been described with respect to a case in which processing is performed by the sample adaptive offset processing unit 520 after processing is performed by the deblocking filter unit 510.

Processing by the deblocking filter unit 510 is performed using pixels situated in adjacent blocks. Because of this, when some of the pixels to which offset values are added cannot be determined due to the fact that the process of counting the number of pixels has not been performed, some of the pixels cannot be processed by the deblocking filter unit 510. In this case, a memory space for storing pixels on an interim basis is required, which increases memory space usage.

In consideration of this, the configuration may be made such that the process of counting the number of pixels, among the processes performed by the class offset processing unit 1001, is performed before processing by the deblocking filter unit 510. This arrangement enables the determination of pixels to which offset values are added, thereby avoiding an increase in memory space usage. The configuration may also be made such that whether or not to perform the process of counting the number of pixels prior to the process of the deblocking filter unit 510 is determined on a stream-specific basis.

It should be noted that the present invention is not limited to the above-described configurations such as the configurations described in the above-described embodiments and combinations thereof with other components. In this respect, modifications may be made without departing from the spirit of the invention, and choices may properly be made according to the mode of application.

What is claimed is:

1. An encoding method in video encoder, comprising:
a compression encoding process of performing compression on input image data to produce data stream, the compression encoding process including performing a sample adaptive offset (SAO) process prior to producing the data steam,
wherein the SAO process includes:
a counting process of dividing a gray-scale range of pixels of a coding unit block into a plurality of classes each having a predetermined number of gray-scale levels, and counting a number of pixels belonging to each of the plurality of classes;
a class addition process of selecting top n classes (n: an integer greater than or equal to 1) having a largest number of counted pixels, and adding offset values to pixel values of pixels belonging to the n selected classes; and
a first signaling process of signaling SAO parameters including the added offset values.

2. The encoding method as claimed in claim 1, wherein the gray-scale range is 2BD gray-scale levels (BD: an integer greater than or equal to 8), and the counting process divides the gray-scale range into a plurality of classes each having at least 2(BD-7) gray-scale levels.

3. The encoding method as claimed in claim 1, wherein the class addition process selects top four or six classes having a largest number of counted pixels.

4. The encoding method as claimed in claim 1, further comprising:
a band dividing process of dividing a gray-scale range of pixels of a coding unit block into 32 bands;

a band addition process of determining a band position from the 32 bands and adding offset values to pixel values of pixels belonging to 4 bands selected in response to the determined band position; and a second signaling process of signaling SAO parameters including the determined band position and the added offset values.

5. A decoding method in video decoder, comprising:

a decompression decoding process of performing decompression on data stream to produce image data, the decompression decoding process including performing a sample adaptive offset (SAO) process prior to producing the image data, wherein the SAO process includes:

a counting process of dividing a gray-scale range of pixels of a coding unit block into a plurality of classes each having a predetermined number of gray-scale levels, and counting a number of pixels belonging to each of the plurality of classes;

a first obtainment process of obtaining offset values included in signaled SAO parameters; and a class addition process of selecting top n classes (n: an integer greater than or equal to 1) having a largest number of counted pixels, and adding the obtained offset values to pixel values of pixels belonging to the n selected classes.

6. The decoding method as claimed in claim 5, wherein the gray-scale range is 2BD gray-scale levels (BD: an integer greater than or equal to 8), and the counting process divides the gray-scale range into a plurality of classes each having at least 2(BD-7) gray-scale levels.

7. The decoding method as claimed in claim 5, wherein the class addition process selects top four or six classes having a largest number of counted pixels.

8. The decoding method as claimed in claim 5, further comprising:

a band dividing process of dividing a gray-scale range of pixels of a coding unit block into 32 bands;

a second obtainment process of obtaining a band position and offset values included in signaled SAO parameters; and a band addition process of adding the obtained offset values to pixel values of pixels belonging to 4 bands selected in response to the obtained band position.

9. An encoding apparatus comprising:

a memory; and a processor coupled to the memory and configured to perform:

a compression encoding process of performing compression on input image data to produce data stream, the compression encoding process including performing a sample adaptive offset (SAO) process prior to producing the data steam, wherein the SAO process includes:

dividing a gray-scale range of pixels of a coding unit block into a plurality of classes each having a predetermined number of gray-scale levels, followed by counting a number of pixels belonging to each of the plurality of classes;

selecting top n classes (n: an integer greater than or equal to 1) having a largest number of counted pixels, followed by adding offset values to pixel values of pixels belonging to the n selected classes; and signaling SAO parameters including the added offset values.

10. A decoding apparatus comprising:

a memory; and a processor coupled to the memory and configured to perform:

a decompression decoding process of performing decompression on data stream to produce image data, the decompression decoding process including performing a sample adaptive offset (SAO) process prior to producing the image data, wherein the SAO process includes:

dividing a gray-scale range of pixels of a coding unit block into a plurality of classes each having a predetermined number of gray-scale levels, followed by counting a number of pixels belonging to each of the plurality of classes;

obtaining offset values included in signaled SAO parameters; and selecting top n classes (n: an integer greater than or equal to 1) having a largest number of counted pixels, followed by adding the obtained offset values to pixel values of pixels belonging to the n selected classes.

* * * * *